(12) United States Patent
Kung et al.

(10) Patent No.: US 11,363,571 B2
(45) Date of Patent: *Jun. 14, 2022

(54) METHOD AND APPARATUS FOR HANDLING RETRANSMISSION INDICATION FOR CONFIGURED GRANT IN SIDELINK IN A WIRELESS COMMUNICATION SYSTEM

(71) Applicant: ASUSTek Computer Inc., Taipei (TW)

(72) Inventors: Yi-Hsuan Kung, Taipei (TW); Chun-Wei Huang, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,361

(22) Filed: Jan. 5, 2021

(65) Prior Publication Data

US 2021/0127385 A1  Apr. 29, 2021

Related U.S. Application Data

(63) Continuation of application No. 16/851,623, filed on Apr. 17, 2020, now Pat. No. 10,925,039.

(Continued)

(51) Int. Cl.
*H04W 72/04* (2009.01)
*H04W 76/27* (2018.01)
(Continued)

(52) U.S. Cl.
CPC ....... *H04W 72/0406* (2013.01); *H04L 1/1812* (2013.01); *H04L 5/0007* (2013.01);
(Continued)

(58) Field of Classification Search
CPC ........... H04W 72/0406; H04W 72/042; H04W 72/14; H04W 72/1278; H04W 72/1289;
(Continued)

(56) References Cited

U.S. PATENT DOCUMENTS

2015/0271807 A1* 9/2015 Patil ................. H04W 72/048
455/426.1
2015/0327220 A1* 11/2015 Pan .................. H04W 72/042
370/329

(Continued)

FOREIGN PATENT DOCUMENTS

WO    2018004322 A1    1/2018

OTHER PUBLICATIONS

Fujitsu,"Discussion on HARQ-ACK feedback over PUCCH and PUSCH", 3GPP TSG RAN WG1 Meeting #95 R1-1812414, Spokane, USA, Nov. 12-16, 2018.

(Continued)

*Primary Examiner* — Kevin D Mew
(74) *Attorney, Agent, or Firm* — Cooper Legal Group LLC

(57) ABSTRACT

A method and apparatus are disclosed. In an example, a first device receives first information and second information from a base station. The first device is configured with a configured grant for sidelink communication via the first information. The configured grant is indicative of first resources for sidelink communication. The second information is indicative of one or more timing offsets and an identity for second resources. The first device transmits sidelink data to a second device via a first resource of the first resources. The first device receives and/or detects a first signal, from the second device, indicative of a reception result associated with the sidelink data. The first device determines a second time and a frequency location based on the second information. The first device transmits a second signal to the base station via a second resource associated with the second time and the frequency location.

20 Claims, 12 Drawing Sheets

Related U.S. Application Data

(60) Provisional application No. 62/840,720, filed on Apr. 30, 2019.

(51) Int. Cl.
  *H04L 1/18* (2006.01)
  *H04L 5/00* (2006.01)
  *H04W 56/00* (2009.01)
  *H04W 72/14* (2009.01)

(52) U.S. Cl.
  CPC ....... *H04W 56/0045* (2013.01); *H04W 72/14* (2013.01); *H04W 76/27* (2018.02)

(58) Field of Classification Search
  CPC ............ H04W 72/1294; H04W 76/10; H04W 76/11; H04W 76/12; H04W 76/15; H04W 76/20; H04W 76/27; H04W 56/0045; H04L 1/1812; H04L 5/0007
  See application file for complete search history.

(56) References Cited

U.S. PATENT DOCUMENTS

| | | | | |
|---|---|---|---|---|
| 2016/0183219 | A1* | 6/2016 | Kim | H04W 72/0406 370/329 |
| 2016/0337839 | A1* | 11/2016 | Chae | H04W 76/14 |
| 2017/0019886 | A1* | 1/2017 | Patel | H04W 76/14 |
| 2017/0118749 | A1* | 4/2017 | Cai | H04W 8/005 |
| 2018/0049235 | A1 | 2/2018 | Baghel et al. | |
| 2018/0103460 | A1* | 4/2018 | Sharma | H04W 72/14 |
| 2018/0139734 | A1* | 5/2018 | Babaei | H04W 72/0406 |
| 2018/0263026 | A1 | 9/2018 | Loehr et al. | |
| 2018/0368090 | A1* | 12/2018 | Kadambar | H04W 72/1278 |
| 2019/0045521 | A1* | 2/2019 | Hong | H04W 56/001 |
| 2019/0207662 | A1* | 7/2019 | Zhou | H04W 76/27 |
| 2019/0207737 | A1* | 7/2019 | Babaei | H04B 7/0626 |
| 2019/0363843 | A1* | 11/2019 | Gordaychik | H04L 1/1854 |
| 2020/0029318 | A1* | 1/2020 | Guo | H04W 72/042 |
| 2020/0229145 | A1* | 7/2020 | Kang | H04W 4/40 |
| 2021/0321435 | A1* | 10/2021 | Golitschek Edler von Elbwart | H04W 72/1215 |

OTHER PUBLICATIONS

Intel Corporation, "Network controlled sidelink resource allocation design for NR V2X communication", 3GPP TSG RAN WG1 Meeting #96bis, R1-1904295, Xi'an, China, Apr. 8-12, 2019.

Samsung, "On Sidelink HARQ Procedure", 3GPP TSG RAN WG1 #96bis R1-1904433, Xi'an, China, Apr. 8-12, 2019.

European Search Report from corresponding EP Application No. 20170000.2 dated Jun. 5, 2020, 11 pgs.

Vivo, "Discussion on mode 1 resource allocation mechanism", 3GPP TSG RAN WG1 #96bis; R1-1904073; Xi'an, China, Apr. 2019.

\* cited by examiner

METHOD AND APPARATUS FOR HANDLING RETRANSMISSION INDICATION FOR CONFIGURED GRANT IN SIDELINK IN A WIRELESS COMMUNICATION SYSTEM

CROSS-REFERENCE TO RELATED APPLICATIONS

The present application claims priority to and is a continuation of U.S. application Ser. No. 16/851,623, filed on Apr. 17, 2020, entitled "METHOD AND APPARATUS FOR HANDLING RETRANSMISSION INDICATION FOR CONFIGURED GRANT IN SIDELINK IN A WIRELESS COMMUNICATION SYSTEM", which claims the benefit of U.S. Provisional Patent Application Ser. No. 62/840,720 filed on Apr. 30, 2019. The entire disclosure of U.S. application Ser. No. 16/851,623 and the entire disclosure of U.S. Provisional Patent Application Ser. No. 62/840,720 are incorporated herein in their entirety by reference.

FIELD

This disclosure generally relates to wireless communication networks, and more particularly, to a method and apparatus for handling a retransmission indication for a configured grant in sidelink in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device receives a Radio Resource Control (RRC) message from a base station. The RRC message comprises first information and second information. The first device is configured with a configured grant for sidelink communication via the first information. The configured grant is indicative of a first plurality of resources for sidelink communication. The second information is indicative of one or more timing offsets and an identity for a second plurality of resources. The first device transmits sidelink data to a second device via a first resource of the first plurality of resources. The first device receives and/or detects a first signal, associated with the sidelink data, from the second device at a first time, wherein the first signal is indicative of a reception result associated with the sidelink data. The first device determines a second time based on the one or more timing offsets indicated by the second information. The first device determines a frequency location based on the identity. The first device transmits a second signal to the base station via a second resource, wherein the second resource is associated with the second time and the frequency location.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321-f40; 3GPP TS 36.321-f40; 3GPP TS 36.300-f40; 3GPP RAN1 #94 meeting report; 3GPP RAN1 #95 meeting report; 3GPP RAN1 AH #1901 meeting report; 3GPP RAN1 #96 meeting report; 3GPP RAN2 #104 meeting report; 3GPP TS 36.213-f40; 3GPP RAN2 #105bis meeting report; R1-1903367, Feature lead summary for agenda item 7.2.4.1.2 Physical layer procedures, RAN1 #96 meeting, LG Electronics; R1-1901931, Discussion on physical layer procedure for NR V2X, LG Electronics; 3GPP TS 38.213-f50. The standards and documents listed above are hereby expressly incorporated by reference in their entirety.

Figure 1:
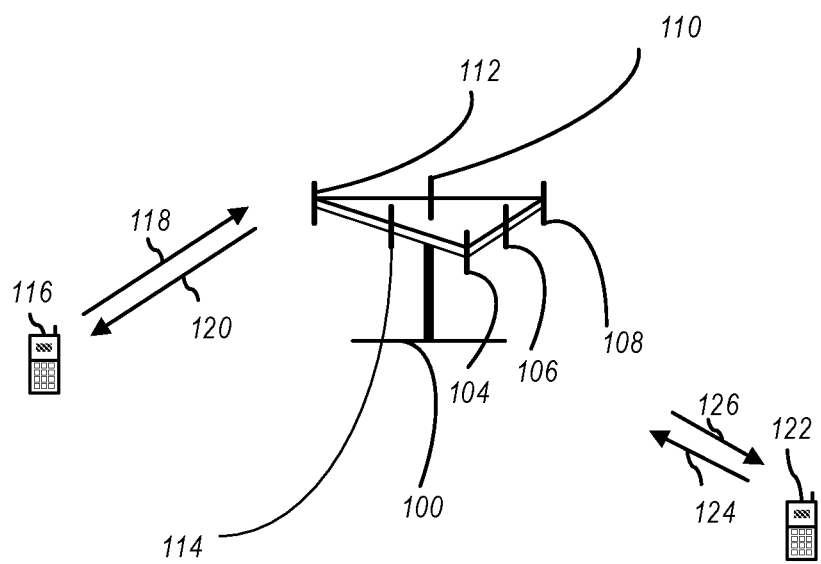
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
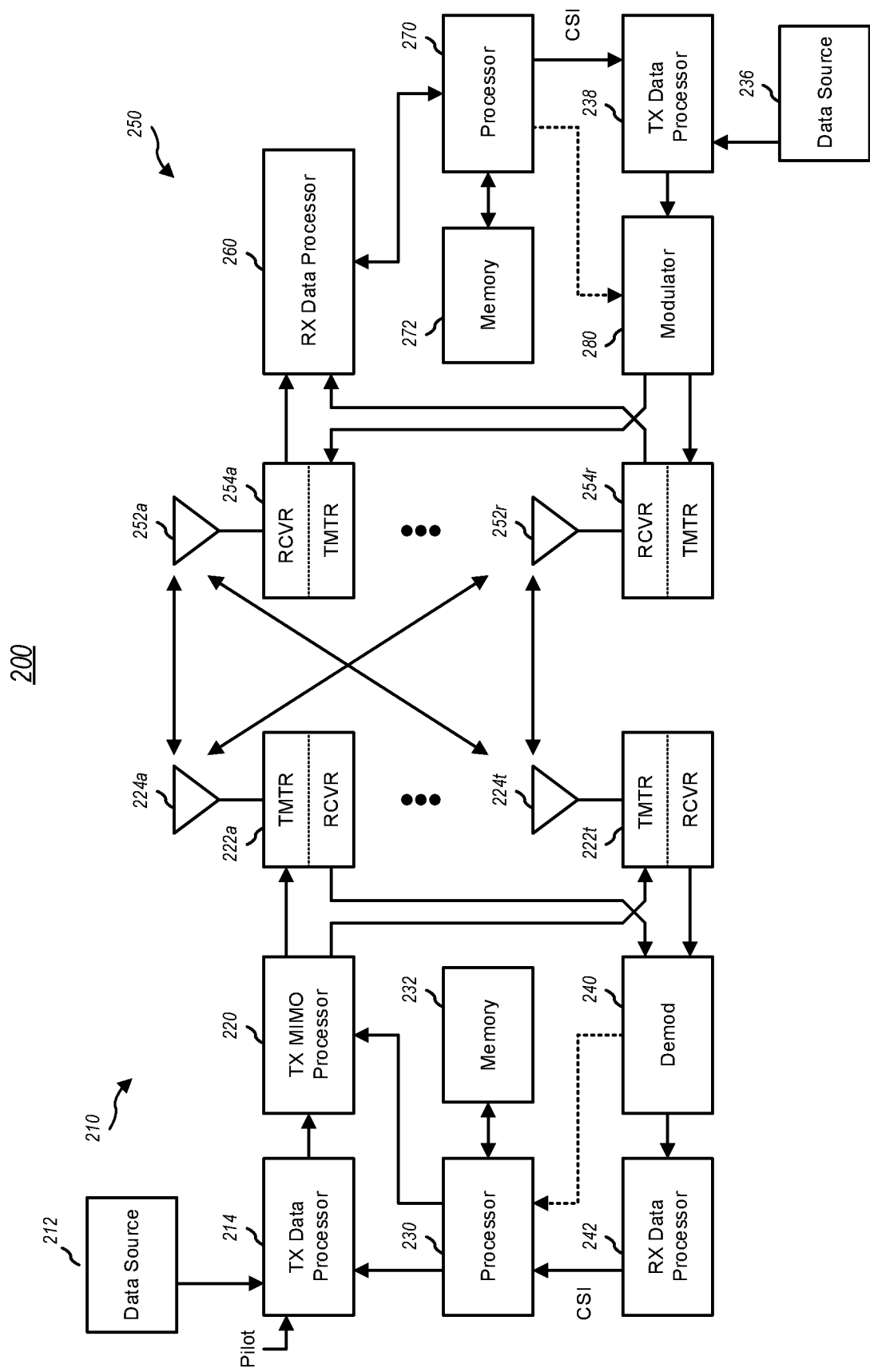
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 may then determine which pre-coding matrix to use for determining the beamforming weights and may then process the extracted message.

Figure 3:
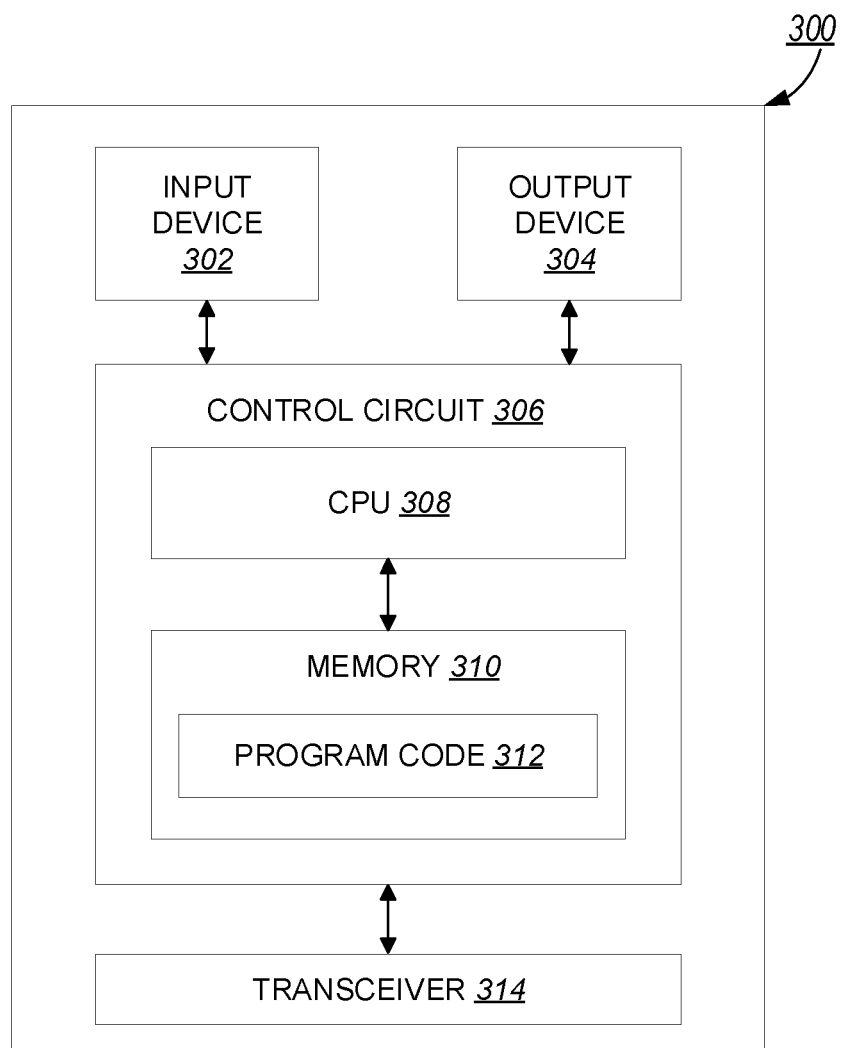
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
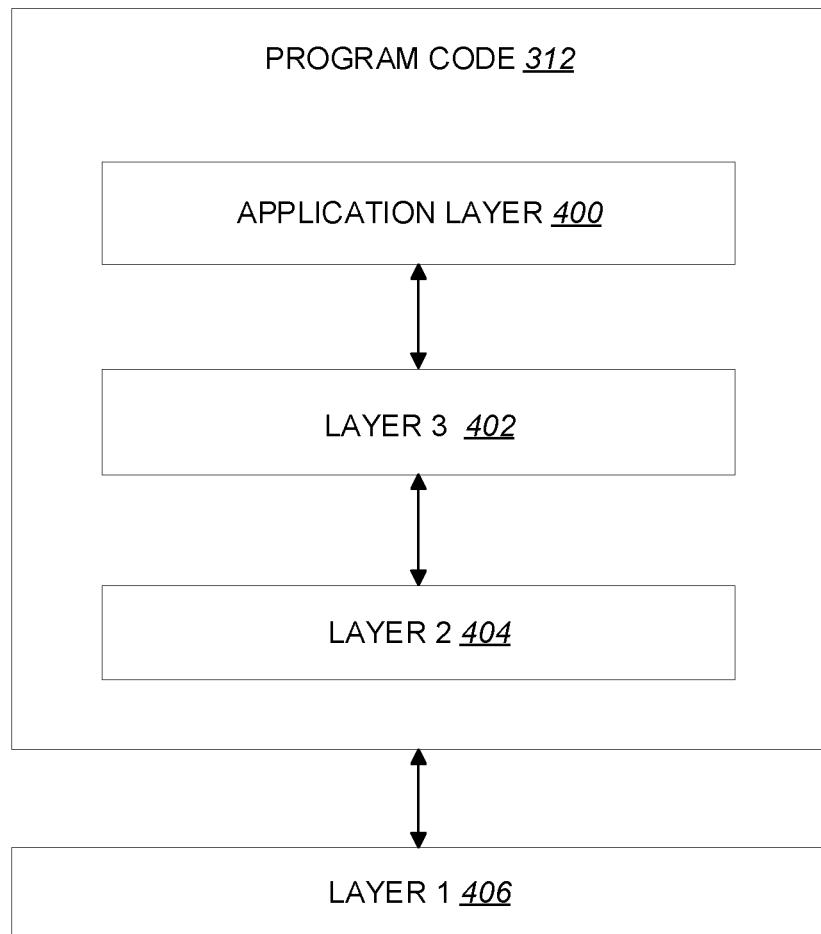
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Description, in 3GPP TS 38.321-f40, of Scheduling Request (SR) and Buffer Status Report (BSR) for uplink in Medium Access Control (MAC) specification is quoted below:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

RRC configures the following parameters for the scheduling request procedure:
- sr-ProhibitTimer (per SR configuration);
- sr-TransMax (per SR configuration).

The following UE variables are used for the scheduling request procedure:
- SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see subclause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR:
  2> initiate a Random Access procedure (see subclause 5.1) on the SpCell and cancel the pending SR.
1> else, for the SR configuration corresponding to the pending SR:
  2> when the MAC entity has an SR transmission occasion on the valid PUCCH resource for SR configured; and
  2> if sr-ProhibitTimer is not running at the time of the SR transmission occasion; and
  2> if the PUCCH resource for the SR transmission occasion does not overlap with a measurement gap; and
  2> if the PUCCH resource for the SR transmission occasion does not overlap with a UL-SCH resource:
    3> if SR_COUNTER<sr-TransMax:
      4> increment SR_COUNTER by 1;
      4> instruct the physical layer to signal the SR on one valid PUCCH resource for SR;
      4> start the sr-ProhibitTimer.
    3> else:
      4> notify RRC to release PUCCH for all Serving Cells;
      4> notify RRC to release SRS for all Serving Cells;
      4> clear any configured downlink assignments and uplink grants;
      4> clear any PUSCH resources for semi-persistent CSI reporting;
      4> initiate a Random Access procedure (see subclause 5.1) on the SpCell and cancel all pending SRs.

5.4.5 Buffer Status Reporting

The Buffer Status reporting (BSR) procedure is used to provide the serving gNB with information about UL data volume in the MAC entity.

RRC configures the following parameters to control the BSR:
- periodicBSR-Timer;
- retxBSR-Timer;
- logicalChannelSR-DelayTimerApplied;
- logicalChannelSR-DelayTimer;
- logicalChannelSR-Mask;
- logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR shall be triggered if any of the following events occur:
  UL data, for a logical channel which belongs to an LCG, becomes available to the MAC entity; and either
    this UL data belongs to a logical channel with higher priority than the priority of any logical channel containing available UL data which belong to any LCG; or
    none of the logical channels which belong to an LCG contains any available UL data.
  in which case the BSR is referred below to as 'Regular BSR';
  UL resources are allocated and number of padding bits is equal to or larger than the size of the Buffer Status Report MAC CE plus its subheader, in which case the BSR is referred below to as 'Padding BSR';
  retxBSR-Timer expires, and at least one of the logical channels which belong to an LCG contains UL data, in which case the BSR is referred below to as 'Regular BSR';
  periodicBSR-Timer expires, in which case the BSR is referred below to as 'Periodic BSR'.
  NOTE: When Regular BSR triggering events occur for multiple logical channels simultaneously, each logical channel triggers one separate Regular BSR.
For Regular BSR, the MAC entity shall:
  1> if the BSR is triggered for a logical channel for which logicalChannelSR-DelayTimerApplied is configured by upper layers:
    2> start or restart the logicalChannelSR-DelayTimer.
  1> else:
    2> if running, stop the logicalChannelSR-DelayTimer.
For Regular and Periodic BSR, the MAC entity shall:
  1> if more than one LCG has data available for transmission when the MAC PDU containing the BSR is to be built:
    2> report Long BSR for all LCGs which have data available for transmission.
  1> else:
    2> report Short BSR.
For Padding BSR:
  1> if the number of padding bits is equal to or larger than the size of the Short BSR plus its subheader but smaller than the size of the Long BSR plus its subheader:
    2> if more than one LCG has data available for transmission when the BSR is to be built:
      3> if the number of padding bits is equal to the size of the Short BSR plus its subheader:
        4> report Short Truncated BSR of the LCG with the highest priority logical channel with data available for transmission.
      3> else:
        4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
    2> else:
      3> report Short BSR.
  1> else if the number of padding bits is equal to or larger than the size of the Long BSR plus its subheader:
    2> report Long BSR for all LCGs which have data available for transmission.
For BSR triggered by retxBSR-Timer expiry, the MAC entity considers that the logical channel that triggered the BSR is the highest priority logical channel that has data available for transmission at the time the BSR is triggered.
The MAC entity shall:
  1> if the Buffer Status reporting procedure determines that at least one BSR has been triggered and not cancelled:
    2> if UL-SCH resources are available for a new transmission and the UL-SCH resources can accommodate the BSR MAC CE plus its subheader as a result of logical channel prioritization:
      3> instruct the Multiplexing and Assembly procedure to generate the BSR MAC CE(s);
      3> start or restart periodicBSR-Timer except when all the generated BSRs are long or short Truncated BSRs;
      3> start or restart retxBSR-Timer.
    2> if a Regular BSR has been triggered and logicalChannelSR-DelayTimer is not running:
      3> if there is no UL-SCH resource available for a new transmission; or
      3> if the MAC entity is configured with configured uplink grant(s) and the Regular BSR was triggered for a logical channel for which logicalChannelSR-Mask is set to false; or
      3> if the UL-SCH resources available for a new transmission do not meet the LCP mapping restrictions (see subclause 5.4.3.1) configured for the logical channel that triggered the BSR:
        4> trigger a Scheduling Request.
  NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.
A MAC PDU shall contain at most one BSR MAC CE, even when multiple events have triggered a BSR. The Regular BSR and the Periodic BSR shall have precedence over the padding BSR.
The MAC entity shall restart retxBSR-Timer upon reception of a grant for transmission of new data on any UL-SCH.
All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

Description, in 3GPP TS 36.321-f40, of sidelink resource allocation and utilization mechanism in MAC specification is quoted below:
5.14 SL-SCH Data transfer
5.14.1 SL-SCH Data transmission
5.14.1.1 SL Grant reception and SCI transmission
In order to transmit on the SL-SCH the MAC entity must have at least one sidelink grant.
[ . . . ]
Sidelink grants are selected as follows for V2X sidelink communication:
  if the MAC entity is configured to receive a sidelink grant dynamically on the PDCCH and data is available in STCH, the MAC entity shall:

use the received sidelink grant to determine the number of HARQ retransmissions and the set of subframes in which transmission of SCI and SL-SCH occur according to subclause 14.2.1 and 14.1.1.4A of [2];
consider the received sidelink grant to be a configured sidelink grant;
if the MAC entity is configured by upper layers to receive a sidelink grant on the PDCCH addressed to SL Semi-Persistent Scheduling V-RNTI, the MAC entity shall for each SL SPS configuration:
  if PDCCH contents indicate SPS activation:
    use the received sidelink grant to determine the number of HARQ retransmissions and the set of subframes in which transmission of SCI and SL-SCH occur according to subclause 14.2.1 and 14.1.1.4A of [2];
    consider the received sidelink grant to be a configured sidelink grant;
  if PDCCH contents indicate SPS release:
    clear the corresponding configured sidelink grant;
if the MAC entity is configured by upper layers to transmit using pool(s) of resources in one or multiple carriers as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions on a selected carrier according to subclause 5.14.1.5:
  if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or
  if neither transmission nor retransmission has been performed by the MAC entity on any resource indicated in the configured sidelink grant during the last second; or
  if sl-ReselectAfter is configured and the number of consecutive unused transmission opportunities on resources indicated in the configured sidelink grant is equal to sl-ReselectAfter; or
  if there is no configured sidelink grant; or
  if the configured sidelink grant cannot accommodate a RLC SDU by using the maximum allowed MCS configured by upper layers in max MCS-PSSCH and the MAC entity selects not to segment the RLC SDU; or
  NOTE: If the configured sidelink grant cannot accommodate the RLC SDU, it is left for UE implementation whether to perform segmentation or sidelink resource reselection.
if transmission(s) with the configured sidelink grant cannot fulfil the latency requirement of the data in a sidelink logical channel according to the associated PPPP, and the MAC entity selects not to perform transmission(s) corresponding to a single MAC PDU; or
NOTE: If the latency requirement is not met, it is left for UE implementation whether to perform transmission(s) corresponding to single MAC PDU or sidelink resource reselection.
if a pool of resources is configured or reconfigured by upper layers for the selected carrier:
  clear the configured sidelink grant, if available;
  trigger the TX carrier (re-)selection procedure as specified in sub-clause 5.14.1.5;
if the carrier is (re-)selected in the Tx carrier (re-)selection according to sub-clause 5.14.1.5, the following is performed on the selected carrier:
  select one of the allowed values configured by upper layers in restrictResourceReservationPeriod and set the resource reservation interval by multiplying 100 with the selected value;
  NOTE: How the UE selects this value is up to UE implementation.
  randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
  select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
  select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
  if transmission based on random selection is configured by upper layers:
    randomly select the time and frequency resources for one transmission opportunity from the resource pool, according to the amount of selected frequency resources. The random function shall be such that each of the allowed selections can be chosen with equal probability;
  else:
    randomly select the time and frequency resources for one transmission opportunity from the resources indicated by the physical layer according to sub-clause 14.1.1.6 of [2], according to the amount of selected frequency resources. The random function shall be such that each of the allowed selections can be chosen with equal probability;
  use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];
if the number of HARQ retransmissions is equal to 1 and there are available resources left in the resources indicated by the physical layer that meet the conditions in subclause 14.1.1.7 of [2] for more transmission opportunities:
randomly select the time and frequency resources for one transmission opportunity from the available resources, according to the amount of selected frequency resources. The random function shall be such that each of the allowed selections can be chosen with equal probability;
use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];
consider the first set of transmission opportunities as the new transmission opportunities and the other set of transmission opportunities as the retransmission opportunities;
consider the set of new transmission opportunities and retransmission opportunities as the selected sidelink grant.
else:
consider the set as the selected sidelink grant;
use the selected sidelink grant to determine the set of subframes in which transmissions of SCI and SL-SCH occur according to subclause 14.2.1 and 14.1.1.4B of [2];
consider the selected sidelink grant to be a configured sidelink grant;
else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:
clear the configured sidelink grant, if available;
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
use the previously selected sidelink grant for the number of transmissions of the MAC PDUs determined in subclause 14.1.1.4B of [2] with the resource reservation interval to determine the set of subframes in which transmissions of SCI and SL-SCH occur according to subclause 14.2.1 and 14.1.1.4B of [2];
consider the selected sidelink grant to be a configured sidelink grant;
else, if the MAC entity is configured by upper layers to transmit using pool(s) of resources in one or multiple carriers as indicated in subclause 5.10.13.1 of [8], the MAC entity selects to create a configured sidelink grant corresponding to transmission(s) of a single MAC PDU, and data is available in STCH associated with one or multiple carriers, the MAC entity shall for a Sidelink process on a selected carrier according to subclause 5.14.1.5:
trigger the TX carrier (re-)selection procedure as specified in sub-clause 5.14.1.5;
if the carrier is (re-)selected in the Tx carrier (re-) selection according to sub-clause 5.14.1.5, the following is performed on the selected carrier:
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;
if transmission based on random selection is configured by upper layers:
randomly select the time and frequency resources for one transmission opportunity of SCI and SL-SCH from the resource pool, according to the amount of selected frequency resources. The random function shall be such that each of the allowed selections can be chosen with equal probability;
else:
randomly select the time and frequency resources for one transmission opportunity of SCI and SL-SCH from the resources indicated by the physical layer according to subclause 14.1.1.6 of [2], according to the amount of selected frequency resources. The random function shall be such that each of the allowed selections can be chosen with equal probability;
if the number of HARQ retransmissions is equal to 1:
if transmission based on random selection is configured by upper layers and there are available resources that meet the conditions in subclause 14.1.1.7 of [2] for one more transmission opportunity:
randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
else, if transmission based on sensing or partial sensing is configured by upper layers and there are available resources left in the resources indicated by the physical layer that meet the conditions in subclause 14.1.1.7 of [2] for one more transmission opportunity:
  randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
consider a transmission opportunity which comes first in time as the new transmission opportunity and a transmission opportunity which comes later in time as the retransmission opportunity;
consider both of the transmission opportunities as the selected sidelink grant;
else:
  consider the transmission opportunity as the selected sidelink grant;
use the selected sidelink grant to determine the subframes in which transmission(s) of SCI and SL-SCH occur according to subclause 14.2.1 and 14.1.1.4B of [2];
consider the selected sidelink grant to be a configured sidelink grant.

The MAC entity shall for each subframe:
  if the MAC entity has a configured sidelink grant occurring in this subframe:
    if SL_RESOURCE_RESELECTION_COUNTER=1 and the MAC entity randomly selected, with equal probability, a value in the interval [0, 1] which is above the probability configured by upper layers in probResourceKeep:
      set the resource reservation interval equal to 0;
    if the configured sidelink grant corresponds to transmission of SCI:
      for V2X sidelink communication in UE autonomous resource selection:
        select a MCS which is, if configured, within the range that is configured by upper layers between min MCS-PSSCH and max MCS-PSSCH included in pssch-TxConfigList and, if configured by upper layers, overlapped between min MCS-PSSCH and max MCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
      for V2X sidelink communication in scheduled resource allocation:
      select a MCS unless it is configured by upper layer;
      instruct the physical layer to transmit SCI corresponding to the configured sidelink grant;
      for V2X sidelink communication, deliver the configured sidelink grant, the associated HARQ information and the value of the highest priority of the sidelink logical channel(s) in the MAC PDU to the Sidelink HARQ Entity for this subframe;
    else if the configured sidelink grant corresponds to transmission of first transport block for sidelink communication:
      deliver the configured sidelink grant and the associated HARQ information to the Sidelink HARQ Entity for this subframe.

5.14.1.2 Sidelink HARQ Operation
5.14.1.2.1 Sidelink HARQ Entity
The MAC entity is configured by upper layers to transmit using pool(s) of resources on one or multiple carriers as indicated in subclause 5.10.13.1 of 3GPP TS 36.331 [8], there is one Sidelink HARQ Entity at the MAC entity for each carrier for transmission on SL-SCH, which maintains a number of parallel Sidelink processes.

For sidelink communication, the number of transmitting Sidelink processes associated with the Sidelink HARQ Entity is defined in [8].

For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.

A delivered and configured sidelink grant and its associated HARQ information are associated with a Sidelink process. For each subframe of the SL-SCH and each Sidelink process, the Sidelink HARQ Entity shall:
  if a sidelink grant corresponding to a new transmission opportunity has been indicated for this Sidelink process and there is SL data, for sidelink logical channels of ProSe destination associated with this sidelink grant, available for transmission:
    obtain the MAC PDU from the "Multiplexing and assembly" entity;
    deliver the MAC PDU and the sidelink grant and the HARQ information to this Sidelink process;
    instruct this Sidelink process to trigger a new transmission.
  else, if this subframe corresponds to retransmission opportunity for this Sidelink process:
    instruct this Sidelink process to trigger a retransmission.
      NOTE: The resources for retransmission opportunities are specified in subclause 14.2.1 of [2] unless specified in subclause 5.14.1.1.

5.14.1.2.2 Sidelink Process
The Sidelink process is associated with a HARQ buffer.
The sequence of redundancy versions is 0, 2, 3, 1. The variable CURRENT_IRV is an index into the sequence of redundancy versions. This variable is updated modulo 4.
New transmissions and retransmissions either for a given SC period in sidelink communication or in V2X sidelink communication are performed on the resource indicated in the sidelink grant as specified in subclause 5.14.1.1 and with the MCS selected as specified in subclause 5.14.1.1.
If the sidelink process is configured to perform transmissions of multiple MAC PDUs for V2X sidelink communication the process maintains a counter SL_RESOURCE_RESELECTION_COUNTER. For other configurations of the sidelink process, this counter is not available.
If the Sidelink HARQ Entity requests a new transmission, the Sidelink process shall:
  set CURRENT_IRV to 0;
  store the MAC PDU in the associated HARQ buffer;

store the sidelink grant received from the Sidelink HARQ Entity;
generate a transmission as described below.

If the Sidelink HARQ Entity requests a retransmission, the Sidelink process shall:
generate a transmission as described below.

To generate a transmission, the Sidelink process shall:
if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and
if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:
instruct the physical layer to generate a transmission according to the stored sidelink grant with the redundancy version corresponding to the CURRENT_IRV value.
increment CURRENT_IRV by 1;
if this transmission corresponds to the last transmission of the MAC PDU:
decrement SL_RESOURCE_RESELECTION_COUNTER by 1, if available.

The transmission of V2X sidelink communication is prioritized over uplink transmission if the following conditions are met:
if the MAC entity is not able to perform uplink transmissions and transmissions of V2X sidelink communication simultaneously at the time of the transmission; and
if uplink transmission is not prioritized by upper layer according to [15]; and
if the value of the highest priority of the sidelink logical channel(s) in the MAC PDU is lower than thresSL-TxPrioritization if thresSL-TxPrioritization is configured.

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupInfoList [8]. LCG is defined per ProSe Destination.

A sidelink Buffer Status Report (BSR) shall be triggered if any of the following events occur:
if the MAC entity has a configured SL-RNTI or a configured SL-V-RNTI:
SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
retx-BSR-TimerSL expires and the MAC entity has data available for transmission for any of the sidelink logical channels, in which case the Sidelink BSR is referred below to as "Regular Sidelink BSR";
periodic-BSR-TimerSL expires, in which case the Sidelink BSR is referred below to as "Periodic Sidelink BSR";
else:
An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".

For Regular and Periodic Sidelink BSR:
if the number of bits in the UL grant is equal to or larger than the size of a Sidelink BSR containing buffer status for all LCGs having data available for transmission plus its subheader:
report Sidelink BSR containing buffer status for all LCGs having data available for transmission;
else report Truncated Sidelink BSR containing buffer status for as many LCGs having data available for transmission as possible, taking the number of bits in the UL grant into consideration.

For Padding Sidelink BSR:
if the number of padding bits remaining after a Padding BSR has been triggered is equal to or larger than the size of a Sidelink BSR containing buffer status for all LCGs having data available for transmission plus its subheader:
report Sidelink BSR containing buffer status for all LCGs having data available for transmission;
else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:
if the MAC entity has UL resources allocated for new transmission for this TTI and the allocated UL resources can accommodate a Sidelink BSR MAC control element plus its subheader as a result of logical channel prioritization:
instruct the Multiplexing and Assembly procedure to generate the Sidelink BSR MAC control element(s);
start or restart periodic-BSR-TimerSL except when all the generated Sidelink BSRs are Truncated Sidelink BSRs;

start or restart retx-BSR-TimerSL;
else if a Regular Sidelink BSR has been triggered:
if an uplink grant is not configured:
a Scheduling Request shall be triggered.
A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.
The MAC entity shall restart retx-BSR-TimerSL upon reception of an SL grant.
All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.
The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.
All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.
   NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.
[ . . . ]
Description, in 3GPP TS 36.300-f40, of support for sidelink Semi-Persistent Scheduling (SPS) is quoted below:
23.14.1.1 Support for V2X Sidelink Communication
[ . . . ]
For sidelink SPS, maximum 8 SPS configurations with different parameters can be configured by eNB and all SPS configurations can be active at the same time. The activation/deactivation of SPS configuration is signalled via PDCCH by eNB. The existing logical channel prioritization based on PPPP is used for sidelink SPS.
UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP, PPPR, Destination Layer-2 ID, and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.
Description, in 3GPP TS 36.213-f40, of UE procedure for transmitting a PSCCH is quoted below:
14.1.1.4A UE Procedure for Determining Subframes and Resource Blocks for Transmitting PSSCH for Sidelink Transmission Mode 3
If the UE has a configured sidelink grant (described in [8]) in subframe $t_n^{SL}$ with the corresponding PSCCH resource m (described in Subclause 14.2.4), the resource blocks and subframes of the corresponding PSSCH transmissions are determined according to 14.1.1.4C.
If the UE has a configured sidelink grant (described in [8]) for an SL SPS configuration activated by Subclause 14.2.1 and if a set of sub-channels in subframe $t_m^{SL}$ is determined as the time and frequency resource for PSSCH transmission corresponding to the configured sidelink grant (described in [8]) of the SL SPS configuration, the same set of sub-channels in subframes $t_{m+j \times P'_{SPS}}^{SL}$ are also determined for PSSCH transmissions corresponding to the same sidelink grant where j=1, 2, . . . , $P'_{SPS}=P_{step} \times P_{SPS}/100$, and ($t_0^{SL}$, $t_1^{SL}$, $t_2^{SL}$, . . . ) is determined by Subclause 14.1.5. Here, $P_{SPS}$ is the sidelink SPS interval of the corresponding SL SPS configuration.
14.2.1 UE Procedure for Transmitting the PSCCH
[ . . . ]
For sidelink transmission mode 3,
   The UE shall determine the subframes and resource blocks for transmitting SCI format 1 as follows:
      SCI format 1 is transmitted in two physical resource blocks per slot in each subframe where the corresponding PSSCH is transmitted.
      If the UE receives in subframe n DCI format 5A with the CRC scrambled by the SL-V-RNTI, one transmission of PSCCH is in the PSCCH resource $L_{init}$ (described in Subclause 14.2.4) in the first subframe that is included in ($t_0^{SL}$, $t_1^{SL}$, $t_2^{SL}$, . . . ) and that starts not earlier than $$T_{DL} - \frac{N_{TA}}{2} \times T_S + (4+m) \times 10^{-3}.$$

$L_{init}$ is the value indicated by "Lowest index of the sub-channel allocation to the initial transmission" associated with the configured sidelink grant (described in [8]), ($t_0^{SL}$, $t_1^{SL}$, $t_2^{SL}$, . . . ) is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].
         If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe n+$k_{init}$. $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTx}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among {0, 3, 6, 9} in each PSCCH transmission.

For sidelink transmission mode 4,
The UE shall determine the subframes and resource blocks for transmitting SCI format 1 as follows:
SCI format 1 is transmitted in two physical resource blocks per slot in each subframe where the corresponding PSSCH is transmitted.
If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.
If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.
the UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation field according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among {0, 3, 6, 9} in each PSCCH transmission.

In 3GPP TS 38.213-f50, timing determination for HARQ feedback for downlink SPS is introduced:
9.1.2 Type-1 HARQ-ACK Codebook Determination
This subclause applies if the UE is configured with pdsch-HARQ-ACK-Codebook=semi-static.
A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format 1_0 or DCI format 1_1. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1.
If the UE is provided pdsch-AggregationFactor, $N_{PDSCH}^{repeat}$ is a value of pdsch-AggregationFactor; otherwise, $N_{PDSCH}^{repeat}=1$. The UE reports HARQ-ACK information for a PDSCH reception from slot $n-N_{PDSCH}^{repeat}+1$ to slot n only in a HARQ-ACK codebook that the UE includes in a PUCCH or PUSCH transmission in slot n+k, where k is a number of slots indicated by the PDSCH-to-HARQ_feedback timing indicator field in a corresponding DCI format or provided by dl-DataToUL-ACK if the PDSCH-to-HARQ feedback timing field is not present in the DCI format. If the UE reports HARQ-ACK information for the PDSCH reception in a slot other than slot n+k, the UE sets a value for each corresponding HARQ-ACK information bit to NACK.

If a UE reports HARQ-ACK information in a PUCCH only for
- a SPS PDSCH release indicated by DCI format 1_0 with counter DAI field value of 1 on the PCell, or
- a PDSCH reception scheduled by DCI format 1_0 with counter DAI field value of 1 on the PCell, or
- SPS PDSCH reception within the $M_{A,c}$ occasions for candidate PDSCH receptions as determined in Subclause 9.1.2.1, the UE determines a HARQ-ACK codebook only for the SPS PDSCH release or only for the PDSCH reception or only for the SPS PDSCH reception according to corresponding $M_{A,c}$ occasion(s) on respective serving cell(s); otherwise, the procedures in Subclause 9.1.2.1 and Subclause 9.1.2.2 for a HARQ-ACK codebook determination apply.

9.2.2 PUCCH Formats for UCI Transmission

If a UE is not transmitting PUSCH, and the UE is transmitting UCI, the UE transmits UCI in a PUCCH using
  PUCCH format 0 if
    the transmission is over 1 symbol or 2 symbols,
    the number of HARQ-ACK information bits with positive or negative SR (HARQ-ACK/SR bits) is 1 or 2
  PUCCH format 1 if
    the transmission is over 4 or more symbols,
    the number of HARQ-ACK/SR bits is 1 or 2
  PUCCH format 2 if
    the transmission is over 1 symbol or 2 symbols,
    the number of UCI bits is more than 2
  PUCCH format 3 if
    the transmission is over 4 or more symbols,
    the number of UCI bits is more than 2,
    the PUCCH resource does not include an orthogonal cover code
  PUCCH format 4 if
    the transmission is over 4 or more symbols,
    the number of UCI bits is more than 2,
    the PUCCH resource includes an orthogonal cover code In 3GPP TS 38.321-f40, transmission and reception without dynamic scheduling in NR is introduced:

5.8 Transmission and Reception without Dynamic Scheduling 5.8.1 Downlink

Semi-Persistent Scheduling (SPS) is configured by RRC per Serving Cell and per BWP. Activation and deactivation of the DL SPS are independent among the Serving Cells.

For the DL SPS, a DL assignment is provided by PDCCH, and stored or cleared based on L1 signalling indicating SPS activation or deactivation.

RRC configures the following parameters when SPS is configured:
  cs-RNTI: CS-RNTI for activation, deactivation, and retransmission;
  nrofHARQ-Processes: the number of configured HARQ processes for SPS;
  periodicity: periodicity of configured downlink assignment for SPS.

When SPS is released by upper layers, all the corresponding configurations shall be released.

After a downlink assignment is configured for SPS, the MAC entity shall consider sequentially that the $N^{th}$ downlink assignment occurs in the slot for which:

(numberOfSlotsPerFrame×SFN+slot number in the frame)=[(numberOfSlotsPerFrame× $SFN_{start\ time}$+$slot_{start\ time}$)+N×periodicity×numberOfSlotsPerFrame/10]modulo (1024×numberOfSlotsPerFrame)

where $SFN_{start\ time}$ and $slot_{start\ time}$ are the SFN and slot, respectively, of the first transmission of PDSCH where the configured downlink assignment was (re-)initialised.

5.8.2 Uplink

There are two types of transmission without dynamic grant:
  configured grant Type 1 where an uplink grant is provided by RRC, and stored as configured uplink grant;
  configured grant Type 2 where an uplink grant is provided by PDCCH, and stored or cleared as configured uplink grant based on L1 signalling indicating configured uplink grant activation or deactivation.

Type 1 and Type 2 are configured by RRC per Serving Cell and per BWP. Multiple configurations can be active simultaneously only on different Serving Cells. For Type 2, activation and deactivation are independent among the Serving Cells. For the same Serving Cell, the MAC entity is configured with either Type 1 or Type 2.

RRC configures the following parameters when the configured grant Type 1 is configured:
  cs-RNTI: CS-RNTI for retransmission;
  periodicity: periodicity of the configured grant Type 1;
  timeDomainOffset: Offset of a resource with respect to SFN=0 in time domain;
  timeDomainAllocation: Allocation of configured uplink grant in time domain which contains startSymbolAndLength (i.e. SLIV in TS 38.214 [7]);
  nrofHARQ-Processes: the number of HARQ processes for configured grant.

RRC configures the following parameters when the configured grant Type 2 is configured:
  cs-RNTI: CS-RNTI for activation, deactivation, and retransmission;
  periodicity: periodicity of the configured grant Type 2;
  nrofHARQ-Processes: the number of HARQ processes for configured grant.

Upon configuration of a configured grant Type 1 for a Serving Cell by upper layers, the MAC entity shall:
  1> store the uplink grant provided by upper layers as a configured uplink grant for the indicated Serving Cell;
  1> initialise or re-initialise the configured uplink grant to start in the symbol according to timeDomainOffset and S (derived from SLIV as specified in TS 38.214 [7]), and to reoccur with periodicity.

After an uplink grant is configured for a configured grant Type 1, the MAC entity shall consider that the uplink grant recurs associated with each symbol for which:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo(1024×numberOfSlotsPerFrame×numberOfSymbolsPerSlot), for all N>=0.

After an uplink grant is configured for a configured grant Type 2, the MAC entity shall consider that the uplink grant recurs associated with each symbol for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+N×periodicity]modulo(1024×numberOfSlotsPerFrame×numberOfSymbolsPerSlot), for all N>=0.

where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised.

When a configured uplink grant is released by upper layers, all the corresponding configurations shall be released and all corresponding uplink grants shall be cleared.

The MAC entity shall:
1> if the configured uplink grant confirmation has been triggered and not cancelled; and
1> if the MAC entity has UL resources allocated for new transmission:
2> instruct the Multiplexing and Assembly procedure to generate an Configured Grant Confirmation MAC CE as defined in subclause 6.1.3.7;
2> cancel the triggered configured uplink grant confirmation.

For a configured grant Type 2, the MAC entity shall clear the configured uplink grant immediately after first transmission of Configured Grant Confirmation MAC CE triggered by the configured uplink grant deactivation.

Retransmissions except for repetition of configured uplink grants use uplink grants addressed to CS-RNTI.

Agreements in 3GPP RAN1 #94 meeting report about NR Vehicle-to-Everything (V2X) are quoted below.
Agreements:
RAN1 assumes that the physical layer knows the following information for a certain transmission belonging to a unicast or groupcast session. Note RAN1 has not made agreement about the usage of this information.
ID
Groupcast: destination group ID, FFS: source ID
Unicast: destination ID, FFS: source ID
HARQ process ID (FFS for groupcast)
RAN1 can continue discussion on other information
Agreements:
At least PSCCH and PSSCH are defined for NR V2X.
PSCCH at least carries information necessary to decode PSSCH.
[ . . . ]
Agreements:
RAN1 to continue study on multiplexing physical channels considering at least the above aspects:
Multiplexing of PSCCH and the associated PSSCH (here, the "associated" means that the PSCCH at least carries information necessary to decode the PSSCH).
Study further the following options:
Option 1: PSCCH and the associated PSSCH are transmitted using non-overlapping time resources.
Option 1A: The frequency resources used by the two channels are the same.
Option 1B: The frequency resources used by the two channels can be different.
Option 2: PSCCH and the associated PSSCH are transmitted using non-overlapping frequency resources in the all the time resources used for transmission. The time resources used by the two channels are the same.
Option 3: A part of PSCCH and the associated PSSCH are transmitted using overlapping time resources in non-overlapping frequency resources, but another part of the associated PSSCH and/or another part of the PSCCH are transmitted using non-overlapping time resources.
[ . . . ]
Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources
Agreements in 3GPP RAN1 #95 meeting report are quoted below:
Agreements:
It is supported to enable and disable SL HARQ feedback in unicast and groupcast.
In 3GPP RAN1 #Ad-Hoc 1901 meeting (3GPP RAN1 AH #1901 meeting report), agreements about sidelink Hybrid Automatic Repeat Request (HARQ) are quoted below:
Agreements:
Layer-1 destination ID can be explicitly included in SCI
The following additional information can be included in SCI
Layer-1 source ID
HARQ process ID
NDI
RV
Agreements:
It is supported that in mode 1 for unicast, the in-coverage UE sends an indication to gNB to indicate the need for retransmission
At least PUCCH is used to report the information
If feasible, RAN1 reuses PUCCH defined in Rel-15
The gNB can also schedule re-transmission resource
Agreements:
(Pre-)configuration indicates whether SL HARQ feedback is enabled or disabled in unicast and/or groupcast.
When (pre-)configuration enables SL HARQ feedback, FFS whether SL HARQ feedback is always used or there is additional condition of actually using SL HARQ feedback
In 3GPP RAN1 #96 meeting report, an agreement has been made that a UE could send an indication to gNB to indicate the need for retransmission in sidelink in the form of HARQ acknowledgement (ACK)/non-acknowledgement (NACK) or in the form of SR/BSR:
Agreements:
(Pre-)configuration indicates the time gap between PSFCH and the associated PSSCH for Mode 1 and Mode 2.
In 3GPP RAN2 #104 meeting report, an agreement has been made that a UE can be configured to perform both mode-1 and mode-2 at the same time assuming RAN1 does not have concern on it.
In 3GPP RAN2 #105bis meeting report, an agreement has been made for sidelink configured grant:
Agreements on SL configured grant:
1: The type 1 and 2 configured SL grant should be specified for NR SL mode 1.
Some and/or all of the following terminology and assumptions may be used hereafter.
Base station (BS): a network central unit and/or a network node in NR and/or LTE which is used to control one or more transmission and reception points (TRPs) which are associated with one or more cells. Communication between BS and one or more TRPs may be via fronthaul. BS may be referred to as central unit (CU), eNB, gNB and/or NodeB.

TRP: a TRP provides network coverage and directly communicates with UEs. TRP may be referred to as distributed unit (DU) and/or network node.

Cell: a cell may comprise one or more associated TRPs. For example, coverage of the cell is composed of coverage of the one or more associated TRPs. One cell may be controlled by one BS. Cell may be referred to as TRP group (TRPG).

For network side:

Downlink timing of TRPs in the same cell may be synchronized.

Radio Resource Control (RRC) layer of network side may be in a BS.

For UE side:

There are at least two UE (RRC) states: connected state (also called active state) and non-connected state (also called inactive state and/or idle state). Inactive state may be an additional state and/or may belong to connected state and/or non-connected state.

In NR Vehicle-to-Everything (V2X), at least two sidelink resource allocation modes, such as mode 1 and/or mode 2, are defined for NR-V2X sidelink communication. In the mode 1, a base station and/or a network node can schedule one or more sidelink resources to be used by a UE for one or more sidelink transmissions. In the mode 2, a UE determines (i.e. the base station and/or the network node do not schedule) one or more sidelink transmission resources within pre-configured sidelink resources and/or within sidelink resources configured by a base station and/or a network node. For example, in the mode 2, rather than the base station and/or the network node scheduling the one or more sidelink transmission resources as in the mode 1, the UE determines and/or selects the one or more sidelink transmission resources from amongst the pre-configured sidelink resources and/or the sidelink resources configured by the base station and/or the network node. The mode 3 in LTE V2X (such as described in the foregoing description) may be a start point and/or basis for studying and/or designing the mode 1 in NR V2X. The mode 4 in LTE V2X (such as described in the foregoing description) may be a start point and/or basis for studying and/or designing the mode 2 in NR V2X.

Figure 5:
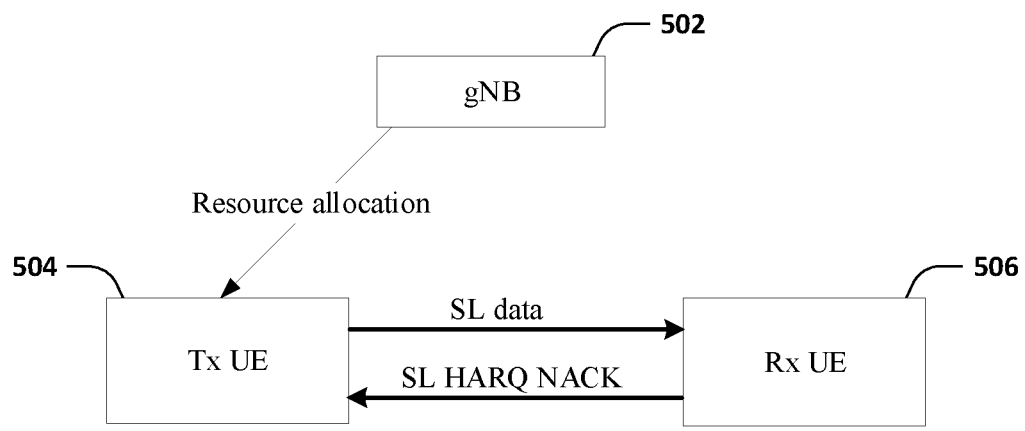
FIG. 5 is a diagram illustrating an exemplary scenario associated with sidelink transmission according to one exemplary embodiment.

In 3GPP meeting RAN1 #95, RAN1 has agreed to support sidelink Hybrid Automatic Repeat Request (SL HARQ) for both unicast and groupcast. FIG. 5 illustrates an exemplary scenario associated with sidelink transmission. A gNB 502 schedules one or more sidelink resources (e.g., mode-1 resources) to (and/or for) a transmitter UE 504 (Tx UE) for sidelink transmission. The one or more sidelink resources may correspond to a scheduled sidelink grant. For example, the gNB 502 may schedule the one or more sidelink resources to (and/or for) the Tx UE 504 by transmitting resource allocation information to the Tx UE 504. The Tx UE 504 transmits sidelink data ("SL data" in FIG. 5) to a receiver UE 506 (Rx UE) via the scheduled sidelink grant (e.g., the one or more sidelink resources scheduled by the gNB 502). The Rx UE 506 may transmit a SL HARQ feedback (e.g., acknowledgement (ACK) or non-acknowledgment (NACK)) to the Tx UE 504 to indicate whether the transmission of the sidelink data is successful (e.g., the SL HARQ feedback may indicate whether the Rx UE 504 successfully received and/or decoded the sidelink data).

In 3GPP meeting RAN1 #96, RAN1 has agreed that in the mode 1 for unicast, a Tx UE may send an indication to gNB to indicate a need for retransmission. The indication may be transmitted via Hybrid Automatic Repeat Request (HARQ) feedback and/or via a scheduling request (SR) and/or SR/Buffer status report (BSR)-like procedure. A SR and/or SR/BSR-like procedure, as used herein, may correspond to a procedure having one or more operations that are similar and/or identical to one or more operations of a SR procedure (e.g., a procedure for requesting resources) and/or one or more operations of a BSR procedure (e.g., a procedure for buffer status reporting). Alternatively and/or additionally, a SR and/or SR/BSR-like procedure, as used herein, may correspond to a procedure comprising transmission and/or reception of one or more signals, wherein the one or more signals comprise information similar and/or identical to information of one or more signals communicated in a SR procedure and/or one or more signals communicated in a BSR procedure.

Figure 6:
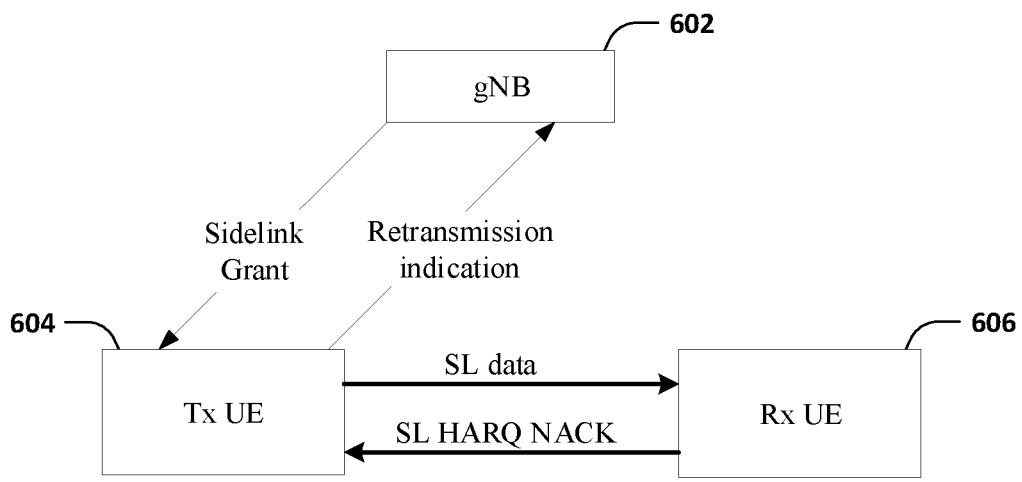
FIG. 6 is a diagram illustrating an exemplary scenario associated with sidelink transmission according to one exemplary embodiment.

FIG. 6 illustrates an exemplary scenario associated with sidelink transmission. A gNB 602 schedules a first sidelink grant to (and/or for) a Tx UE 604 for sidelink transmission. For example, the gNB 602 may schedule the first sidelink grant to (and/or for) the Tx UE 604 via a Downlink Control Indicator and/or a Downlink Control Information (DCI). The Tx UE 604 performs a sidelink transmission to a Rx UE 606 based on the first sidelink grant. The Tx UE 604 may perform the sidelink transmission by transmitting sidelink data ("SL data" in FIG. 6) to the Rx UE 606. If the sidelink transmission is not successful (e.g., the sidelink data is not successfully received and/or decoded by the Rx UE 606), the Rx UE 606 may transmit a HARQ feedback (e.g., a HARQ feedback indicative of NACK) indicating transmission failure to the Tx UE 604. The Tx UE 604 may then transmit a retransmission indication to the gNB 602. The retransmission indication may be transmitted to the gNB 602 responsive to receiving the HARQ feedback. The retransmission indication may be transmitted to the gNB 602 via a HARQ feedback and/or via a SR and/or SR/BSR-like procedure. The retransmission indication may correspond to an indication of a need to retransmit the sidelink data to the Rx UE 606. Alternatively and/or additionally, the retransmission indication may comprise a request for one or more sidelink resources for retransmitting the sidelink data to the Rx UE 606. After (and/or responsive to) receiving the retransmission indication, the gNB 602 may allocate a second sidelink grant to the Tx UE 604 (e.g., the second sidelink grant may correspond to one or more sidelink resources for retransmission of the sidelink data to the Rx UE 606). Timing and/or frequency information associated with the retransmission indication may be indicated by the gNB 602 via a signal scheduling the first sidelink grant (e.g., the signal scheduling the first sidelink grant may comprise information indicative of one or more resources for transmission of the retransmission indication to the gNB 602). In some embodiments, Physical Uplink Control Channel (PUCCH) resource determination mechanism in Uu link may be reused (such as described in R1-1903367). For example, the Tx UE 604 can transmit PUCCH, such as comprising the retransmission indication, based on one or more PUCCH resources indicated by a DCI scheduling one or more sidelink resources (such as described in R1-1901931).

According to MAC specification discussed in 3GPP TS 38.321-f40, two types of configured grants for uplink are introduced:

configured grant Type 1 where an uplink grant is provided by RRC, and stored as configured uplink grant;

configured grant Type 2 where an uplink grant is provided by PDCCH, and stored or cleared as configured uplink grant based on L1 signaling indicating configured uplink grant activation or deactivation.

Figure 7:
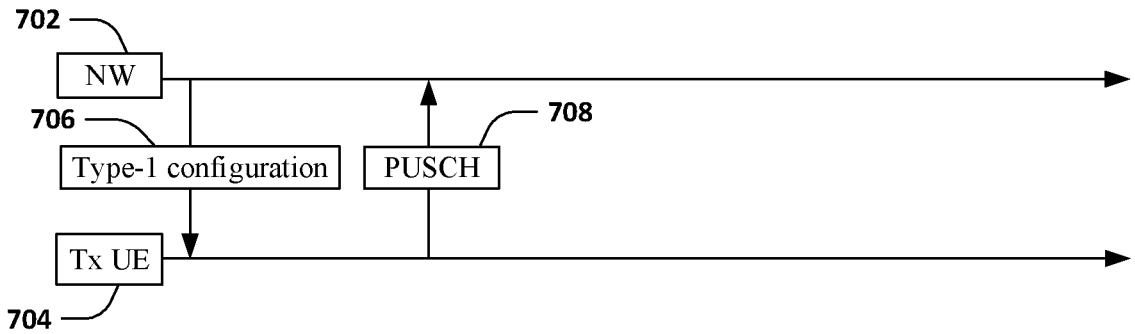
FIG. 7 is a diagram illustrating an exemplary scenario associated with a configured grant according to one exemplary embodiment.

In 3GPP RAN2 #105bis meeting report, it is agreed that Type 1 and Type 2 configured grant will be specified for NR sidelink mode 1. FIG. 7 illustrates an exemplary scenario associated with a configured grant (e.g., a configured grant Type 1) in NR Uu. A network 702 ("NW" in FIG. 7) transmits a RRC message to a Tx UE 704. The RRC message comprises a configured grant Type 1 706 (e.g., a configured grant having Type 1 configuration). In some embodiments, the configured grant 706 is indicative of at least one of a periodicity, an offset of Physical Uplink Shared Channel (PUSCH) resources, etc. The Tx UE 704 performs one or more PUSCH transmissions 708 based on the configured grant Type 1 706 (e.g., the one or more PUSCH transmissions 708 may be performed periodically).

In one possible design for sidelink communication, a Tx UE may be configured with a configured grant Type 1 by a network via a RRC message. The RRC message may be indicative of a periodicity, a time domain allocation, a time domain offset, and/or a number of HARQ processes for one or more configured grants for sidelink communication. The Tx UE may perform a sidelink transmission to a Rx UE based on the one or more configured grants configured by the network via the RRC message. If the sidelink transmission is not successful (e.g., the Rx UE does not successfully receive and/or decode the sidelink transmission), the Rx UE may transmit a HARQ feedback (e.g., NACK) indicating transmission failure to the Tx UE. However, the configured grant Type 1 does not indicate one or more resources for transmission of the HARQ feedback by the Tx UE to the network. Accordingly, the Tx UE may not be able to determine one or more resources for transmitting a retransmission indication and/or the HARQ feedback to the network.

Figure 8:
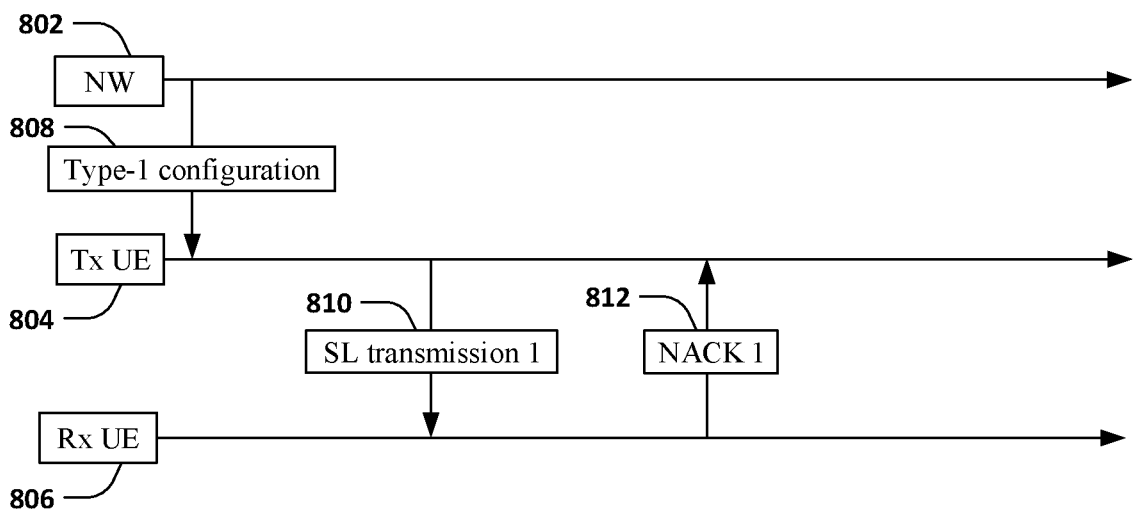
FIG. 8 is a diagram illustrating an exemplary scenario associated with a transmitter UE not being able to determine one or more resources for transmission of a retransmission indication and/or Hybrid Automatic Repeat Request (HARQ) feedback to a network.

FIG. 8 illustrates an exemplary scenario associated with a Tx UE not being able to determine one or more resources for transmission of a retransmission indication and/or HARQ feedback to a network. A network 802 ("NW" in FIG. 8) configures a Tx UE 804 with a configured grant 808 for sidelink communication. The configured grant 808 may be a configured grant Type 1 (e.g., a configured grant having Type 1 configuration). The network 802 may configure the Tx UE 804 with the configured grant 808 via a RRC message. According to NR MAC specification discussed in 3GPP TS 38.321-f40, the network 802 may use the configured grant 808 to configure the Tx UE 804 with at least one of a Configured Scheduling-Radio Network Temporary Identifier (CS-RNTI), a periodicity, a time domain offset, a time domain allocation, a number of HARQ processes, etc. for the Tx UE 804 to perform one or more sidelink transmission. The Tx UE 804 may perform a sidelink transmission 810 ("SL transmission 1" in FIG. 8) based on the configured grant 808. The sidelink transmission 810 may correspond to the Tx UE 804 transmitting sidelink data to a Rx UE 806. After performing the sidelink transmission 810, the Tx UE 804 may receive a HARQ feedback 812 ("NACK 1" in FIG. 8) from the Rx UE 806 indicating a transmission result of the sidelink data (e.g., the HARQ feedback 812 may be indicative of whether the sidelink data is successfully received and/or decoded by the Rx UE 806). If the HARQ feedback 812 indicates transmission failure (e.g., the HARQ feedback 812 corresponds to NACK), the Tx UE 804 may be required to indicate and/or transmit a retransmission indication to the network 802. The retransmission indication may correspond to an indication of a need to retransmit the sidelink data to the Rx UE 806. Alternatively and/or additionally, the retransmission indication may comprise a request for one or more resources for retransmitting the sidelink data to the Rx UE 806. The retransmission indication may be a message transmitted based on a PUCCH resource (e.g., a HARQ-ACK/NACK-like message). A HARQ-ACK/NACK-like message, as used herein, may correspond to a message comprising information similar and/or identical to information of a HARQ feedback message, such as information of a HARQ-ACK message and/or information of a HARQ-NACK message.

In NR Uu communication, an uplink configured grant (e.g., a configured grant Type 1 and/or a configured grant Type 2) may not require PUCCH resources for indicating retransmission because a network can determine (and/or acknowledge) whether an uplink transmission (e.g., a PUSCH transmission) is successful. However, in NR sidelink communication, a network has no knowledge of whether a sidelink transmission by a UE is successfully received by a different UE. With respect to the exemplary scenario of FIG. 8, the network 802 has no knowledge of a result of the sidelink transmission 810, such as whether the sidelink transmission 810 is received by the Rx UE 806. The Tx UE 804 is required to transmit a retransmission indication to the network 802 to inform the network 802 of the result of the sidelink transmission 810 and/or request one or more resources associated with retransmission of the sidelink transmission 810. However, currently designed and/or implemented systems do not provide for transmission of the retransmission indication by the Tx UE 804 to the network 802. For example, currently designed and/or implemented versions of configured grants (e.g., configured grant Type 1 and/or configured grant Type 2) do not provide uplink resources for transmission of the retransmission indication. Further, uplink resources for transmission of the retransmission indication cannot be derived by the Tx UE 804 using currently designed and/or implemented versions of configured grants. Accordingly, the Tx UE 804 may not be able to determine which resources to use for transmission of the retransmission indication. Thus, the Tx UE 804 may not be able to perform a retransmission of the sidelink transmission 810 to the Rx UE 806. The present disclosure provides for solutions to the foregoing issues such that a UE is configured with uplink resources required for transmission of retransmission indications to a network.

A first concept of the present disclosure is that a network may configure a UE with uplink resource information for transmitting one or more retransmission indications associated with a configured grant for sidelink transmission. The configured grant for sidelink transmission may be received by the UE via a RRC message. A retransmission indication of the one or more retransmission indications may be used and/or transmitted by the UE to request one or more retransmission resources, from the network, for retransmitting a sidelink transmission.

The uplink resource information may comprise timing information associated with one or more times when the UE may transmit the one or more retransmission indications. For example, the timing information may be indicative of the one or more times. The UE may transmit the one or more retransmission indications at the one or more times indicated by the timing information. Alternatively and/or additionally, the UE may transmit the indication for retransmission at a first available time at and/or after the one or more times indicated by the timing information, wherein the first available time corresponds to a first time (e.g., an earliest time) at which the UE has one or more uplink resources for transmitting the one or more retransmission indications at and/or after the one or more times indicated by the timing information.

The timing information may comprise one or more timing offsets with respect to a time when the UE transmits sidelink data to a Rx UE based on the configured grant for sidelink transmission.

For example, the UE may transmit the one or more retransmission indications at a time when a timing offset, of the one or more timing offsets, has passed after the UE transmits the sidelink data to the Rx UE. In an example, the UE transmits the sidelink data to the Rx UE at a first time. The UE may transmit the one or more retransmission indications at a second time determined based on the first time and a timing offset of the one or more timing offsets. The second time may correspond to a time when the timing offset has passed after the first time (e.g., in an example where the timing offset is 5 seconds, the second time may correspond to the first time+5 seconds). For example, the timing offset may correspond to a time period between the first time and the second time. Alternatively and/or additionally, the second time may correspond to a first available time at and/or after a time when the timing offset has passed after the first time. The first available time may correspond to an earliest time at which the UE has one or more uplink resources for transmitting the one or more retransmission indications. For example, the second time at which the UE transmits the one or more retransmission indications may correspond to an earliest time at which the UE has one or more uplink resources for transmitting the one or more retransmission indications that is at and/or after the timing offset has passed after the first time. In an example, the timing offset is 5 seconds. In the example, if the UE has one or more uplink resources for transmitting the one or more uplink resources at a time corresponding to the first time+5 seconds, the second time at which the UE transmits the one or more retransmission indications may correspond to the first time+5 seconds. In the example, if the UE does not have one or more uplink resources for transmitting the one or more uplink resources at the time corresponding to the first time+5 seconds, the second time at which the UE transmits the one or more retransmission indications may correspond to an earliest time, after the time corresponding to the first time+5 seconds, that the UE has one or more uplink resources for transmitting the one or more uplink resources. The timing offset may correspond to a slot offset (e.g., the timing offset may be in units of slots).

Alternatively and/or additionally, the timing information may comprise one or more timing offsets with respect to a time when the UE receives feedback (e.g., a HARQ feedback, such as HARQ-ACK and/or HARQ-NACK) associated with the sidelink data from the Rx UE. For example, after transmitting the sidelink data to the Rx UE, the UE may receive the feedback from the Rx UE, where the feedback may indicate whether the sidelink data is successfully received and/or decoded by the Rx UE.

For example, the UE may transmit the one or more retransmission indications at a time when a timing offset, of the one or more timing offsets, has passed after the UE receives the feedback from the Rx UE. In an example, the UE receives the feedback from the Rx UE at a first time. The UE may transmit the one or more retransmission indications at a second time determined based on the first time and a timing offset of the one or more timing offsets. The second time may correspond to a time when the timing offset has passed after the first time. For example, the timing offset may correspond to a time period between the first time and the second time. Alternatively and/or additionally, the second time may correspond to a first available time at and/or after the time when the timing offset has passed after the first time. The first available time may correspond to an earliest time at which the UE has one or more uplink resources for transmitting the one or more retransmission indications.

Alternatively and/or additionally, the timing information may comprise one or more timing offsets with respect to a time when the UE transmits sidelink control information (SCI) to the Rx UE based on the configured grant for sidelink transmission.

For example, the UE may transmit the one or more retransmission indications at a time when a timing offset, of the one or more timing offsets, has passed after the UE transmits the SCI to the Rx UE. In an example, the UE transmits the SCI to the Rx UE at a first time. The UE may transmit the one or more retransmission indications at a second time determined based on the first time and a timing offset of the one or more timing offsets. The second time may correspond to a time when the timing offset has passed after the first time. For example, the timing offset may correspond to a time period between the first time and the second time. Alternatively and/or additionally, the second time may correspond to a first available time at and/or after the time when the timing offset has passed after the first time. The first available time may correspond to an earliest time at which the UE has one or more uplink resources for transmitting the one or more retransmission indications.

Alternatively and/or additionally, the timing information may comprise one or more timing offsets with respect to a time when the UE receives a DCI from the network. In an example, the DCI may comprise a Downlink Control Indicator indicating activation of a configured grant for sidelink (e.g., sidelink transmission and/or sidelink reception).

For example, the UE may transmit the one or more retransmission indications at a time when a timing offset, of the one or more timing offsets, has passed after the UE receives the DCI from the network. In an example, the UE receives the DCI from the network at a first time. The UE may transmit the one or more retransmission indications at a second time determined based on the first time and a timing offset of the one or more timing offsets. The second time may correspond to a time when the timing offset has passed after the first time. For example, the timing offset may correspond to a time period between the first time and the second time. Alternatively and/or additionally, the second time may correspond to a first available time at and/or after the time when the timing offset has passed after the first time. The first available time may correspond to an earliest time at which the UE has one or more uplink resources for transmitting the one or more retransmission indications.

Alternatively and/or additionally, the timing information may comprise one or more timing offsets with respect to a time when the UE receives a RRC message (e.g., a RRC message having a Type 1 configuration, such as a configured grant Type 1) from the network.

For example, the UE may transmit the one or more retransmission indications at a time when a timing offset, of the one or more timing offsets, has passed after the UE receives the RRC message from the network. In an example, the UE receives the RRC message from the network at a first time. The UE may transmit the one or more retransmission indications at a second time determined based on the first time and a timing offset of the one or more timing offsets. The second time may correspond to a time when the timing offset has passed after the first time. For example, the timing offset may correspond to a time period between the first time and the second time. Alternatively and/or additionally, the second time may correspond to a first available time at and/or after the time when the timing offset has passed after the first time. The first available time may correspond to an earliest time at which the UE has one or more uplink resources for transmitting the one or more retransmission indications.

In some embodiments, the UE determines and/or selects a timing offset from amongst the one or more timing offsets indicated by the timing information based on a priority of the sidelink data (transmitted to the Rx UE). For example, the UE may determine to apply and/or use a timing offset of the one or more timing offsets for determining a time at which to transmit the retransmission indication based on the priority of the sidelink data. For example, the UE could use a longer timing offset if the priority of the sidelink data is low, and/or the UE could use a shorter timing offset if the priority of the sidelink data is high.

Alternatively and/or additionally, the UE determines and/or selects a timing offset from amongst the one or more timing offsets indicated by the timing information based on a congestion level of a sidelink channel on which the UE performs the sidelink transmission (to the Rx UE). For example, the UE may determine to apply and/or use a timing offset of the one or more timing offsets for determining a time at which to transmit the retransmission indication to the network based on the congestion level of the sidelink channel. For example, the UE could use a longer timing offset if the congestion level of the sidelink channel is high (and/or low), and/or the UE could use a shorter timing offset if the congestion level of the sidelink channel is low (and/or high).

Figure 9:
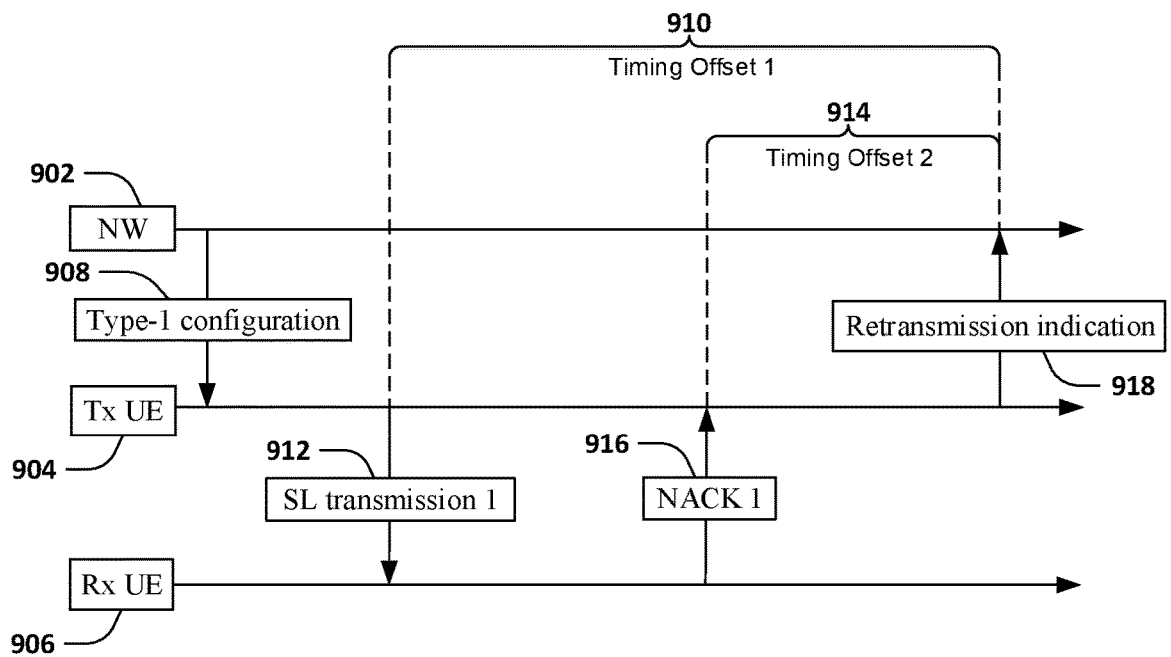
FIG. 9 is a diagram illustrating an exemplary scenario associated with transmission of a retransmission indication to a network according to one exemplary embodiment.

FIG. 9 illustrates an exemplary scenario associated with transmission of a retransmission indication to a network. A network 902 ("NW" in FIG. 9) configures a Tx UE 904 with a configured grant 908 for sidelink communication. The configured grant 908 may be a configured grant Type 1 (e.g., a configured grant having Type 1 configuration). The network 902 may configure the Tx UE 904 with the configured grant 908 via a signal, such as a first RRC message. For example, the network 902 may configure the Tx UE 904 with the configured grant 908 by transmitting the signal to the Tx UE 904. The Tx UE 904 may perform a sidelink transmission 912 ("SL transmission 1" in FIG. 9) based on the configured grant 908. The sidelink transmission 912 may correspond to the Tx UE 904 transmitting sidelink data to a Rx UE 906. After performing the sidelink transmission 912, the Tx UE 904 may receive feedback 916 ("NACK 1" in FIG. 9) from the Rx UE 906 indicating a transmission result of the sidelink data (e.g., the feedback 916 may be indicative of whether the sidelink data is successfully received and/or decoded by the Rx UE 906). For example, the feedback 916 may be indicative of transmission failure associated with the sidelink transmission 912 (e.g., the feedback 916 may correspond to a HARQ-NACK).

In some embodiments, the Tx UE 904 may determine a transmission time and/or a transmission frequency (e.g., a frequency location) for transmission of a retransmission indication 918 to the network 902. For example, the transmission time and/or the transmission frequency may be determined after and/or responsive to receiving the feedback 916 indicative of transmission failure. The transmission time and/or the transmission frequency may be determined based on the configured grant 908 (and/or based on the signal comprising the configured grant 908). Alternatively and/or additionally, the transmission time and/or the transmission frequency may be determined based on first timing information and/or first uplink resource information. The first timing information and/or the first uplink resource information may be included in the configured grant 908 (and/or in the signal comprising the configured grant 908). Alternatively and/or additionally, the first timing information and/or the first uplink resource information may be received separately from the configured grant 908 and/or the signal comprising the configured grant 908.

For example, the first timing information and/or the first uplink resource information may comprise a first timing offset 910 ("Timing Offset 1" in FIG. 9) associated with a time that the Tx UE 904 performs the sidelink transmission 912. In an example where the Tx UE 904 determines the transmission time based on the first timing offset 910, the transmission time at which the Tx UE 904 transmits the retransmission indication 918 to the network may correspond to a time when the first timing offset 910 has passed after the sidelink transmission 912 is performed. For example, the first timing offset 910 may correspond to a time period between the sidelink transmission 912 and the transmission time corresponding to transmission of the retransmission indication 918.

Alternatively and/or additionally, the first timing information and/or the first uplink resource information may comprise a second timing offset 914 ("Timing Offset 2" in FIG. 9) associated with a time that the Tx UE 904 receives the feedback 916 from the Rx UE 906. In an example where the Tx UE 904 determines the transmission time based on the second timing offset 914, the transmission time at which the Tx UE 904 transmits the retransmission indication 918 to the network may correspond to a time when the second timing offset 914 has passed after the feedback 916 is received. For example, the second timing offset 914 may correspond to a time period between the time that the Tx UE 904 receives the feedback 916 and the transmission time corresponding to transmission of the retransmission indication 918.

Alternatively and/or additionally, the timing information may comprise a list of times on a time domain. The list of times may be associated with a frequency range. The frequency range may be a bandwidth part (BWP) on a carrier. Alternatively and/or additionally, the frequency range may be a carrier frequency for the UE. In an example, each time of the list of times may correspond to a time for the UE to transmit the retransmission indication. Alternatively and/or additionally, each time of the list of times may correspond to a timing offset of the one or more timing offsets. For example, the UE may transmit the retransmission indication based upon a time of the list of times using a frequency range and/or a BWP associated with the list of times.

Alternatively and/or additionally, the timing information may be indicative of a pattern (e.g., a fixed, configured and/or pre-configured pattern). The pattern may be indicative of periodic occasions for the UE to transmit the retransmission indication.

For example, the timing information may comprise a periodicity and/or a starting point (e.g., a starting symbol, a starting slot and/or a starting subframe). The UE may determine one or more times for transmission of the one or more retransmission indications based on the periodicity (and/or based on the starting point).

Figure 10:
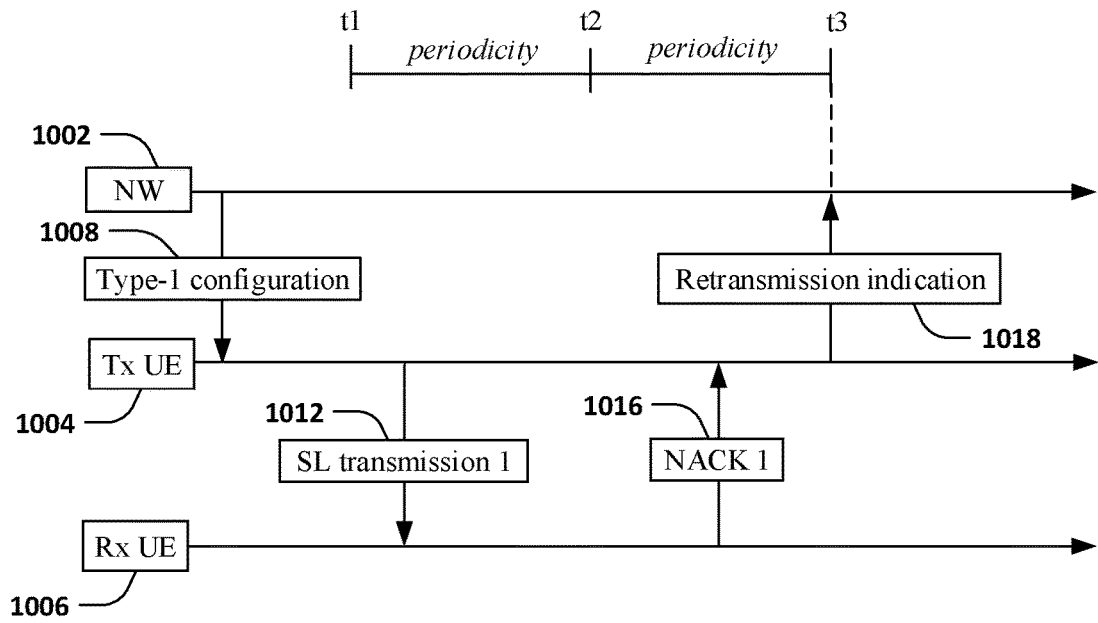
FIG. 10 is a diagram illustrating an exemplary scenario associated with transmission of a retransmission indication to a network according to one exemplary embodiment.

FIG. 10 illustrates an exemplary scenario associated with transmission of a retransmission indication to a network. A network 1002 ("NW" in FIG. 10) configures a Tx UE 1004 with a configured grant 1008 for sidelink communication. The configured grant 1008 may be a configured grant Type 1 (e.g., a configured grant having Type 1 configuration). The network 1002 may configure the Tx UE 1004 with the configured grant 1008 via a signal, such as a first RRC message. For example, the network 1002 may configure the Tx UE 1004 with the configured grant 1008 by transmitting the signal to the Tx UE 1004. The Tx UE 1004 may perform a sidelink transmission 1012 ("SL transmission 1" in FIG. 10) based on the configured grant 1008. The sidelink transmission 1012 may correspond to the Tx UE 1004 transmitting sidelink data to a Rx UE 1006. After performing the sidelink transmission 1012, the Tx UE 1004 may receive feedback 1016 ("NACK 1" in FIG. 10) from the Rx UE 1006 indicating a transmission result of the sidelink data (e.g., the feedback 1016 may be indicative of whether the sidelink data is successfully received and/or decoded by the Rx UE 1006). For example, the feedback 1016 may be indicative of transmission failure associated with the sidelink transmission 1012 (e.g., the feedback 1016 may correspond to a HARQ-NACK).

In some embodiments, the Tx UE 1004 may determine a transmission time and/or a transmission frequency (e.g., a frequency location) for transmission of a retransmission indication 1018 to the network 1002. For example, the transmission time and/or the transmission frequency may be determined after and/or responsive to receiving the feedback 1016 indicative of transmission failure. The transmission time and/or the transmission frequency may be determined based on the configured grant 1008 (and/or based on the signal comprising the configured grant 1008). Alternatively and/or additionally, the transmission time and/or the transmission frequency may be determined based on first timing information and/or first uplink resource information. The first timing information and/or the first uplink resource information may be included in the configured grant 1008 (and/or in the signal comprising the configured grant 1008). Alternatively and/or additionally, the first timing information and/or the first uplink resource information may be received separately from the configured grant 1008 and/or the signal comprising the configured grant 1008.

In some embodiments, the first timing information and/or the first uplink resource information may be indicative of a first periodicity (labeled "periodicity" in FIG. 10). Alternatively and/or additionally, the first timing information and/or the first uplink resource information may be indicative of a first starting point t1. The Tx UE 1004 may determine available transmission times, such as at least one of the first starting point t1, a time t2, a time t3, etc., for transmission of the retransmission indication 1018 to the network 1002. The available transmission times may be spaced by the first periodicity. For example, the first periodicity may correspond to a duration of time between each consecutive pair of times of the available transmission times. The available transmission times may be determined based on the first periodicity and/or the first starting point t1 indicated by the first timing information and/or the first uplink resource information. Alternatively and/or additionally, the first starting point t1 may not be indicated by the first timing information and/or the first uplink resource information. For example, the first starting point t1 may be determined by the Tx UE 1004 (e.g., the first starting point t1 may be determined based on a time of an event, such as at least one of reception of the signal comprising the configured grant 1008, performance of the sidelink transmission 1012, reception of the feedback 1016, etc.). In some embodiments, the Tx UE 1004 may determine the transmission time for transmission of the retransmission indication 1018 based on the available transmission times. For example, responsive to receiving the feedback 1016 indicative of transmission failure, the time t3 of the available transmission times may be selected for transmission of the retransmission indication 1018 to the network 1002 (e.g., the Tx UE 1004 may transmit the retransmission indication 1018 to the network 1002 at the time t3).

In some embodiments, the timing information may comprise a bitmap indicating one or more available times for transmitting the one or more retransmission indications. The bitmap may comprise a plurality of entries, where an entry of the plurality of entries is associated with a slot, a symbol and/or a subframe. An entry of the plurality of entries (and/or each entry of the plurality of entries) may indicate whether a slot, a symbol and/or a subframe associated with the entry is available for transmission of the transmitting the one or more retransmission indications. For example, one or more entries of the plurality of entries may indicate that one or more slots, one or more symbols and/or one or more subframes are available for transmission of the one or more retransmission indications. Alternatively and/or additionally, one or more entries of the plurality of entries may indicate that one or more slots, one or more symbols and/or one or more subframes are not available for transmission of the one or more retransmission indications. In some embodiments, the UE may determine a transmission time for transmitting the one or more retransmission indications based on the bitmap. For example, the transmission time may correspond to a slot, a symbol and/or a subframe that is identified as available for transmission of the one or more retransmission indications by the bitmap.

In some embodiments, the uplink resource information may indicate one or more uplink resources for the UE for transmitting the one or more retransmission indications. Alternatively and/or additionally, the uplink resource information may indicate one or more frequency ranges for the UE to transmit the one or more retransmission indications. Alternatively and/or additionally, the uplink resource information may indicate one or more carriers for the UE to transmit the one or more retransmission indications. Alternatively and/or additionally, the uplink resource information may indicate one or more BWPs for the UE to transmit the one or more retransmission indications. In some embodiments, the UE may transmit the one or more retransmission indications using at least one of an uplink resource of the one or more uplink resources, a frequency range of the one or more frequency ranges, a carrier of the one or more carriers, a BWP of the one or more BWPs, etc. indicated by the uplink resource information.

In some embodiments, the one or more uplink resources for transmitting the one or more retransmission indications may be one or more PUCCH resources. Alternatively and/or additionally, the one or more uplink resources for transmitting the one or more retransmission indications may be one or more PUSCH resources.

In some embodiments, the RRC message may indicate one or more frequency ranges for the UE to transmit the one or more retransmission indications. Alternatively and/or additionally, the RRC message may comprise one or more identities, wherein each identity of the one or more identities is associated with a frequency range of one or more frequency ranges indicated in a frequency list associated with the UE. The frequency list may be associated with a BWP (and/or a carrier) configured by the network and/or pre-configured in the UE. Alternatively and/or additionally, the frequency list may be associated with multiple BWPs (and/or multiple carrier frequencies) configured by the network (and/or pre-configured in the UE).

In some embodiments, the one or more frequency ranges may be one or more PRBs on a carrier and/or on a BWP. Alternatively and/or additionally, the one or more frequency ranges may be one or more PUCCH resources for the UE on the carrier. For example, the one or more retransmission indications may be transmitted via a frequency range of the one or more frequency ranges on the BWP and/or the carrier.

In some embodiments, the carrier may be a carrier currently used by the UE. Alternatively and/or additionally, the carrier may be a carrier different from a carrier with which the UE performs the sidelink transmission based on the configured grant.

In some embodiments, the frequency list may comprise one or more frequency resources. Each frequency resource of the one or more frequency resources may be associated with a frequency location and/or an identity. For example, the frequency list may be analyzed based upon an identity of the one or more identities indicated by the RRC message to identify a frequency resource associated with the identity. The one or more retransmission indications may be transmitted via the frequency resource based upon a determination that the frequency resource is associated with the identity.

In some embodiments, the BWP may be a currently activated BWP (e.g., uplink BWP) of the UE. Alternatively and/or additionally, the BWP may be a currently deactivated BWP (e.g., uplink BWP) of the UE.

In an example, a network may configure a UE with a dedicated carrier (e.g., a specific carrier) for transmission of the one or more retransmission indications, wherein the UE may not transmit the one or more retransmission indications on one or more carriers different than the dedicated carrier. The network may indicate a subset of frequency ranges of the dedicated carrier, wherein the UE transmits the one or more retransmission indications via one or more uplink resources in the subset of frequency ranges, and the UE may not transmit the one or more retransmission indications via one or more uplink resources in one or more frequency ranges different than the subset of frequency ranges.

Alternatively and/or additionally, the network may configure the UE with a dedicated BWP (e.g., a specific BWP) for transmission of the one or more retransmission indications, wherein the UE may not transmit the one or more retransmission indications on one or more BWPs different than the dedicated BWP. If the dedicated BWP is not activated for the UE when the UE is supposed to (e.g., configured to) transmit the one or more retransmission indications, the UE may activate the dedicated BWP (e.g., the UE may activate the dedicated BWP by performing BWP switching) and/or transmit the one or more retransmission indications via the dedicated BWP.

Alternatively and/or additionally, the network may configure the UE with a dedicated frequency range (e.g., a specific frequency range) for transmission of the one or more retransmission indications, wherein the UE may not transmit the one or more retransmission indications via one or more frequency ranges different than (and/or outside) the dedicated frequency range. For example, the UE may transmit the one or more retransmission indications via the dedicated frequency range.

Alternatively and/or additionally, the network may configure the UE with a frequency identity, wherein the frequency identity may be associated with a frequency range. In some embodiments, the frequency range is a subset of a currently activated BWP of the UE. The UE may transmit the one or more retransmission indications via the frequency range.

A second concept of the present disclosure is that a UE may determine, based on a hard-coded configuration in the UE (e.g., a configuration coded by a manufacturer of the UE), one or more uplink resources for transmitting one or more retransmission indications associated with a configured grant for sidelink transmission. The configured grant for sidelink transmission may be received by the UE via a RRC message. A retransmission indication of the one or more retransmission indications may be used and/or transmitted by the UE to request retransmission resources, from a network, for retransmitting a sidelink transmission.

The UE may transmit the one or more retransmission indications using one or more uplink resources associated with a carrier frequency pre-configured in the UE (e.g., the hard-coded configuration in the UE may be indicative of the carrier frequency).

The UE may transmit the one or more retransmission indications using one or more uplink resources associated with a BWP pre-configured in the UE (e.g., the hard-coded configuration in the UE may be indicative of the BWP).

In some embodiments, if the BWP pre-configured in the UE is not activated when the UE is supposed to (e.g., configured to) transmit the one or more retransmission indications, the UE may activate the pre-configured BWP (e.g., the UE may activate the pre-configured BWP by performing BWP switching) and/or transmit the one or more retransmission indications via the pre-configured BWP.

The UE may transmit the one or more retransmission indications using one or more uplink resources associated with a frequency range pre-configured in the UE (e.g., the hard-coded configuration in the UE may be indicative of the frequency range).

A third concept of the present disclosure is that a UE may determine, based upon a PDCCH signal (e.g., DCI), one or more uplink resources for transmitting one or more retransmission indications associated with a configured grant for sidelink transmission. Alternatively and/or additionally, the UE may determine the one or more uplink resources based on one or more frequency ranges associated with the PDCCH signal (and/or indicated by the PDCCH signal). The PDCCH signal may be transmitted to the UE by a network. The configured grant for sidelink transmission may be received by the UE via a RRC message. A retransmission indication of the one or more retransmission indications may be used and/or transmitted by the UE to request retransmission resources, from the network, for retransmitting a sidelink transmission.

In some embodiments, the UE may transmit the one or more retransmission indications using one or more uplink resources that are on a same carrier frequency as the PDCCH signal (e.g., transmission of the one or more retransmission indications and/or reception of the PDCCH signal may be performed by the UE on the same carrier frequency).

Alternatively and/or additionally, the UE may transmit the one or more retransmission indications using one or more uplink resources indicated by the PDCCH signal.

In some embodiments, the PDCCH signal may indicate one or more frequency ranges associated with the one or more uplink resources. The UE may transmit the one or more retransmission indications via the one or more frequency ranges.

The PDCCH signal may indicate one or more times associated with the one or more uplink resources. For example, the PDCCH signal may indicate a timing offset associated with the one or more events, such as at least one of performance of the sidelink transmission, reception of feedback associated with the sidelink transmission, etc. For example, a transmission time for transmitting the one or more retransmission indications may be determined based on the timing offset and/or one or more times of the one or more events.

One, some and/or all of the foregoing concepts and/or embodiments can be formed to a new embodiment.

In some examples, embodiments disclosed herein, such as embodiments described with respect to the first concept, the second concept and the third concept, may be implemented independently and/or separately. Alternatively and/or additionally, a combination of two or more of the embodiments disclosed herein, such as embodiments described with respect to the first concept, the second concept and/or the third concept, may be implemented. Alternatively and/or additionally, a combination of two or more of the embodiments disclosed herein, such as embodiments described with respect to the first concept, the second concept and/or the third concept, may be implemented concurrently and/or simultaneously.

In some embodiments, such as embodiments described herein with respect to the first concept, the second concept and/or the third concept, the configured grant for sidelink transmission may be a configured grant Type 1. Alternatively and/or additionally, the configured grant for sidelink transmission may be configured grant Type 2.

In some embodiments, such as embodiments described herein with respect to the first concept, the second concept and/or the third concept, the indication for retransmission may be a SR. Alternatively and/or additionally, the indication for retransmission may be a BSR MAC CE. Alternatively and/or additionally, the indication for retransmission may be a HARQ feedback (e.g. acknowledgement and/or non-acknowledgement). Alternatively and/or additionally, the indication for retransmission may be transmitted via one or more PUCCH resources. Alternatively and/or additionally, the indication for retransmission may be transmitted via one or more PUSCH resources. Alternatively and/or additionally, the indication for retransmission may indicate that the UE requires one or more sidelink resources for sidelink retransmission.

In some embodiments, such as embodiments described herein with respect to the first concept, the second concept and/or the third concept, the network may allocate one or more sidelink resources in response to the indication for retransmission.

In some embodiments, such as embodiments described herein with respect to the first concept, the second concept and/or the third concept, the one or more uplink resources may be one or more frequency ranges for one or more uplink transmissions. Alternatively and/or additionally, the one or more uplink resources may be associated with a time available for one or more uplink transmissions. Alternatively and/or additionally, the one or more uplink resources may be one or more PUCCH resources. Alternatively and/or additionally, the one or more uplink resources may be one or more PUSCH resources.

In some embodiments, such as embodiments described herein with respect to the first concept, the second concept and/or the third concept, the feedback from the Rx UE may be transmitted via PSFCH.

In some embodiments, such as embodiments described herein with respect to the first concept, the second concept and/or the third concept, the uplink resource information may be associated with one or more HARQ processes of the UE. In some embodiments, the UE requests one or more retransmission resources for the one or more HARQ processes using one or more uplink resources associated with the uplink resource information. In one embodiment, one HARQ process (of the one or more HARQ processes) is associated with one sidelink resource (e.g., a sidelink resource in one or more symbols and/or in a slot). In one embodiment, a different HARQ process (different than the one HARQ process) is associated with a different sidelink resource (different than the one sidelink resource). In some embodiments, the UE requests one or more retransmission resources for the last HARQ process (in time domain) of the one or more HARQ processes in a periodicity. In some embodiments, the UE requests the one or more retransmission resources using one or more uplink resources associated with the uplink resource information. For example, the UE may be configured with one or more sets of one or more sidelink resources associated with one or more configured grants based upon the periodicity. In an example, the UE may be configured with a set of one or more sidelink resources associated with a configured grant every 100 ms (e.g., the periodicity is 100 ms or a different value). At least one sidelink resource of a set of one or more sidelink resources of the one or more sets of one or more sidelink resources is associated with a HARQ process. One or more uplink resources may be associated with the set of one or more sidelink resources in the periodicity. Each uplink resource of the one or more uplink resources is, in time domain, after each sidelink resource of the set of one or more sidelink resources, respectively (e.g., a first uplink resource of the one or more uplink resources may be after a first sidelink resource of the set of one or more sidelink resources, a second uplink resource of the one or more uplink resources may be after a second sidelink resource of the set of one or more sidelink resources, etc.). Alternatively and/or additionally, the one or more uplink resources are, in time domain, after all sidelink resources of the set of one or more sidelink resources. In some embodiments, the UE may not request one or more retransmission resources for HARQ processes other than the one or more HARQ processes using one or more uplink resources associated with the uplink resource information (e.g., the uplink resource information and/or the one or more uplink resources associated with the uplink resource information may be used exclusively for the one or more HARQ processes associated with the uplink resource information).

Figure 11:
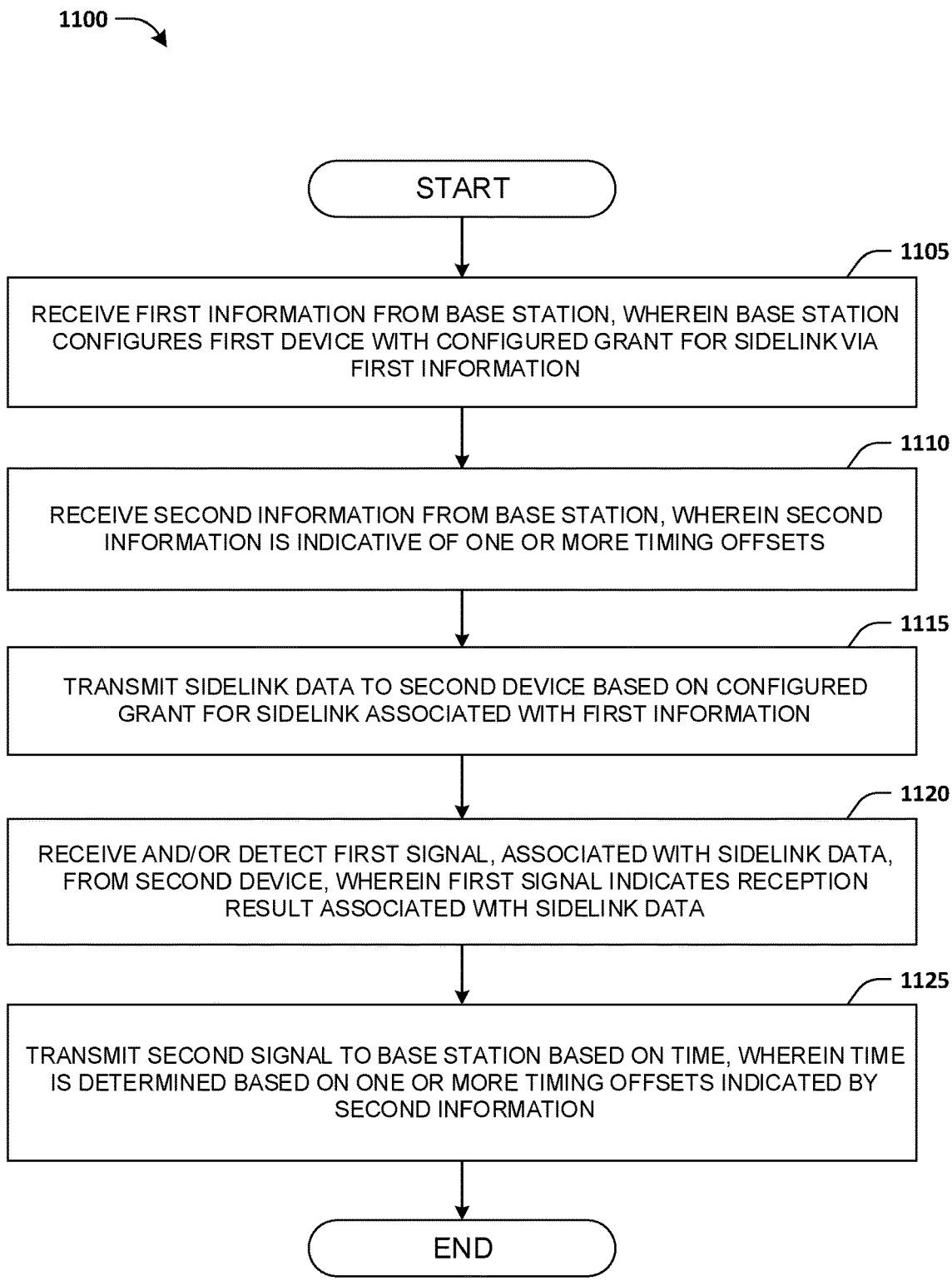
FIG. 11 is a flow chart according to one exemplary embodiment.

FIG. 11 is a flow chart 1100 according to one exemplary embodiment from the perspective of a first device requesting one or more sidelink retransmission resources from a base station. In step 1105, the first device receives a first information from the base station, wherein the base station configures the first device with a configured grant for sidelink via the first information. In step 1110, the first device receives a second information from the base station, wherein the second information is indicative of one or more timing offsets. In step 1115, the first device transmits sidelink data to a second device based on the configured grant for sidelink associated with the first information. In step 1120, the first device receives and/or detects a first signal, associated with the sidelink data, from the second device, wherein the first signal indicates a reception result associated with the sidelink data. In step 1125, the first device transmits a second signal to the base station based on a time, wherein the time is determined based on one or more timing offsets indicated by the second information.

In one embodiment, the first device transmits SCI to the second device based on the configured grant for sidelink associated with the first information, wherein the time is one time period after the first device transmits the SCI, wherein a value and/or a length of the time period equals a timing offset of the one or more timing offsets indicated in the second information.

In one embodiment, the time is one time period after the first device transmits the sidelink data, wherein the length of the time period equals a timing offset of the one or more timing offsets indicated in the second information.

In one embodiment, the time is one time period after the first device receives the first signal from the second device, wherein the length of the time period equals a timing offset of the one or more timing offsets indicated in the second information.

In one embodiment, each timing offset of the one or more timing offsets is associated with one or more Quality of Service (QoS) requirement values, wherein the first device selects a timing offset of the one or more timing offsets based on one or more QoS requirements of the sidelink data and the first device sets the length of the time period to the value of the timing offset selected by the first device. For example, the first device may select the timing offset based on a determination that the one or more QoS requirements of the sidelink data are associated with and/or match one or more QoS requirement values associated with the timing offset.

Referring back to FIGS. 3 and 4, in one exemplary embodiment of a first device requesting one or more sidelink retransmission resources from a base station, the device 300 includes a program code 312 stored in the memory 310. The CPU 308 could execute program code 312 to enable the first device (i) to receive a first information from the base station, wherein the base station configures the first device with a configured grant for sidelink via the first information, (ii) to receive a second information from the base station, wherein the second information is indicative of one or more timing offsets, (iii) to transmit sidelink data to a second device based on the configured grant for sidelink associated with the first information, (iv) to receive and/or detect a first signal, associated with the sidelink data, from the second device, wherein the first signal indicates a reception result associated with the sidelink data, and (v) to transmit a second signal to the base station based on a time, wherein the time is determined based on one or more timing offsets indicated by the second information. Furthermore, the CPU 308 can execute the program code 312 to perform one, some and/or all of the above-described actions and steps and/or others described herein.

Figure 12:
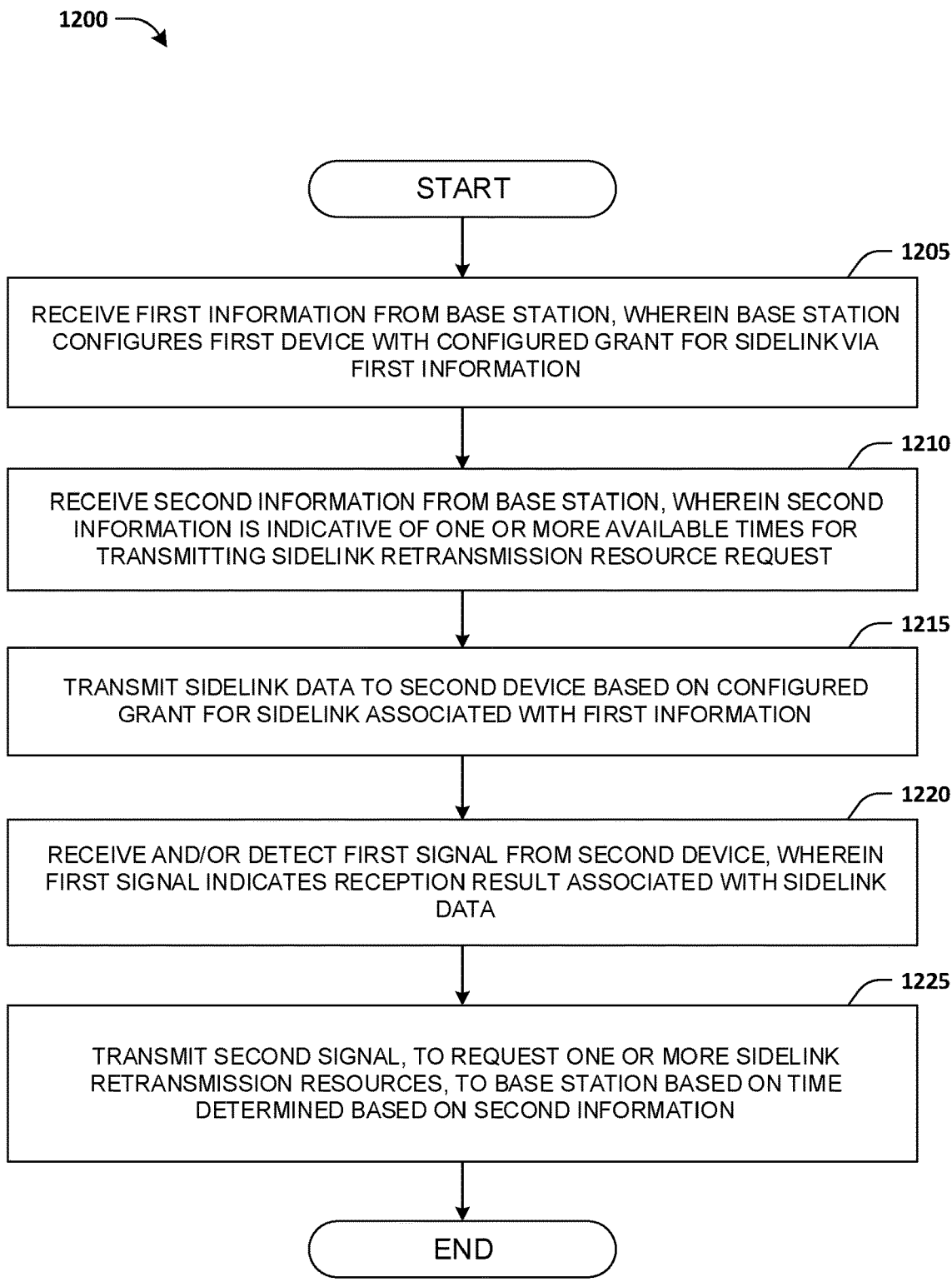
FIG. 12 is a flow chart according to one exemplary embodiment.

FIG. 12 is a flow chart 1200 according to one exemplary embodiment from the perspective of a first device requesting one or more sidelink retransmission resources from a base station. In step 1205, the first device receives a first information from the base station, wherein the base station configures the first device with a configured grant for sidelink via the first information. In step 1210, the first device receives a second information from the base station, wherein the second information is indicative of one or more available times for transmitting a sidelink retransmission resource request. In step 1215, the first device transmits sidelink data to a second device based on the configured grant for sidelink associated with the first information. In step 1220, the first device receives and/or detects a first signal from the second device, wherein the first signal indicates a reception result associated with the sidelink data. In step 1225, the first device transmits a second signal, to request one or more sidelink retransmission resources, to the base station based on a time determined based on the second information.

In one embodiment, the one or more available times correspond to one or more times when the base station is available and/or able to receive a sidelink retransmission resource request.

In one embodiment, the one or more available times correspond to one or more times when one or more uplink resources are available for transmitting a sidelink retransmission resource request to the base station.

In one embodiment, the second information comprises a periodicity, wherein the first device determines the time (and/or the one or more available times) based on the periodicity, wherein each pair of consecutive times, of the one or more available times (available for transmitting the second signal), is spaced by the periodicity. The time may correspond to a time of the one or more available times.

In one embodiment, the second information comprises a bitmap, wherein each entry of the bitmap is associated with a time period and indicates whether the time period is available for transmitting the second signal.

In one embodiment, an entry of the bitmap is the value '1' (or '0') if a time period associated with the entry is available for transmitting the second signal.

In one embodiment, an entry of the bitmap is the value '0' (or '1') if a time period associated with the entry is not available for transmitting the second signal.

In one embodiment, the time is determined based on the bitmap. For example, the time may correspond to a time period indicated by the bitmap as available for transmitting the second signal.

Referring back to FIGS. 3 and 4, in one exemplary embodiment of a first device requesting one or more sidelink retransmission resources from a base station, the device 300 includes a program code 312 stored in the memory 310. The CPU 308 could execute program code 312 to enable the first device (i) to receive a first information from the base station, wherein the base station configures the first device with a configured grant for sidelink via the first information, (ii) to receive a second information from the base station, wherein the second information is indicative of one or more available times for transmitting a sidelink retransmission resource request, (iii) to transmit sidelink data to a second device based on the configured grant for sidelink associated with the first information, (iv) to receive and/or detect a first signal from the second device, wherein the first signal indicates a reception result associated with the sidelink data, and (v) to transmit a second signal, to request one or more sidelink retransmission resources, to the base station based on a time determined based on the second information. Furthermore, the CPU 308 can execute the program code 312 to perform one, some and/or all of the above-described actions and steps and/or others described herein.

With respect to FIGS. 11-12, in one embodiment, the first device transmits the second signal at the time that is determined based on the second information.

In one embodiment, the first device transmits the second signal using one or more first available resources (e.g., earliest available resources) for transmitting the second signal at and/or after the time.

Figure 13:
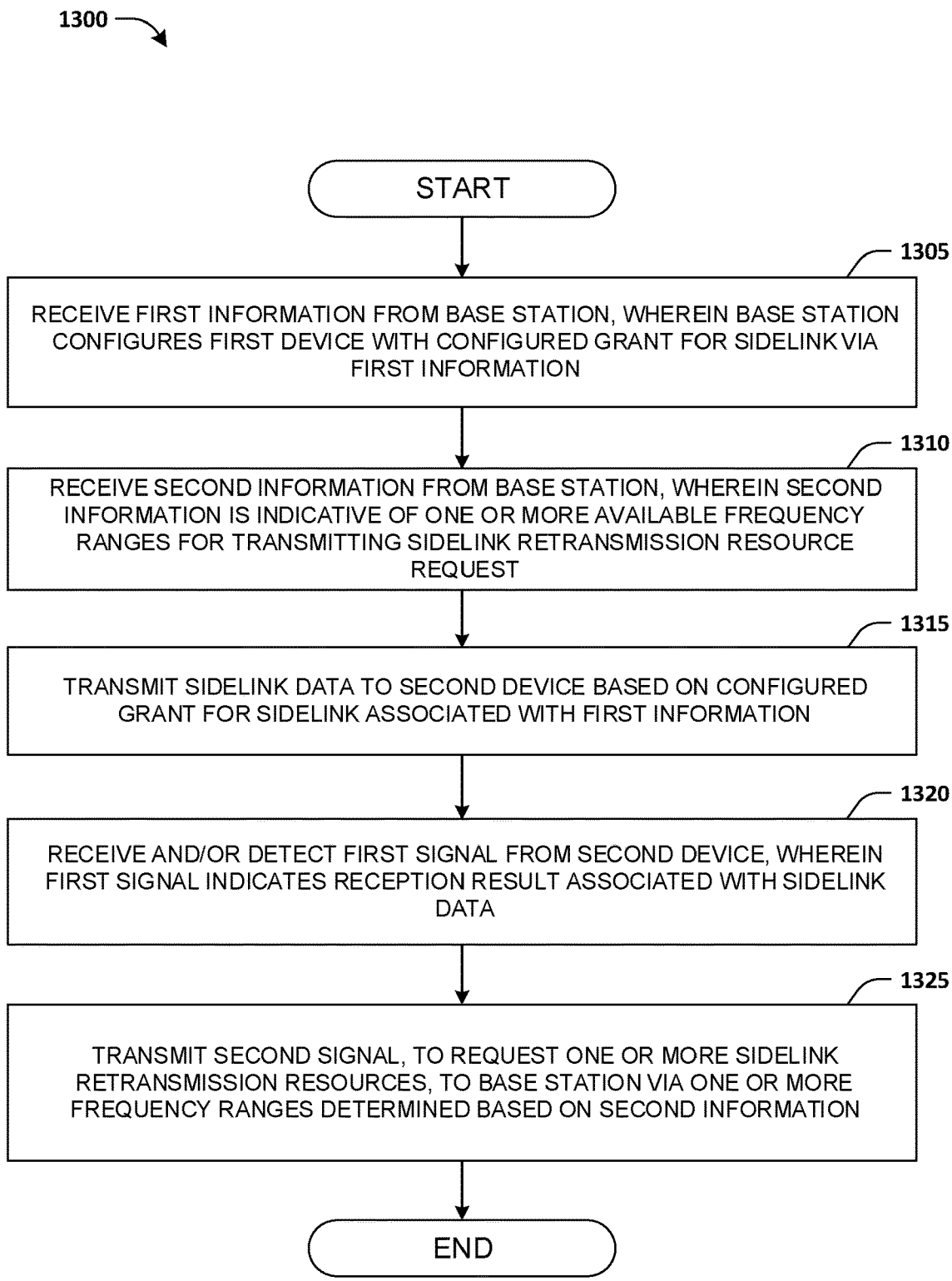
FIG. 13 is a flow chart according to one exemplary embodiment.

FIG. 13 is a flow chart 1300 according to one exemplary embodiment from the perspective of a first device requesting one or more sidelink retransmission resources from a base station. In step 1305, the first device receives a first information from the base station, wherein the base station configures the first device with a configured grant for sidelink via the first information. In step 1310, the first device receives a second information from the base station, wherein the second information is indicative of one or more available frequency ranges for transmitting a sidelink retransmission resource request. In step 1315, the first device transmits sidelink data to a second device based on the configured grant for sidelink associated with the first information. In step 1320, the first device receives and/or detects a first signal from the second device, wherein the first signal indicates a reception result associated with the sidelink data. In step 1325, the first device transmits a second signal, to request one or more sidelink retransmission resources, to the base station via one or more frequency ranges determined based on the second information.

In one embodiment, the base station is available and/or able to receive a sidelink retransmission resource request transmitted with a frequency of the one or more available frequency ranges.

In one embodiment, the second information comprises an identity associated with an index in a frequency list, wherein the frequency list is associated with one or more BWPs for the first device.

In one embodiment, the first device determines to transmit the second signal via one or more first frequency ranges, associated with the index in the frequency list, on an activated BWP (e.g., a currently activated BWP). For example, the one or more first frequency ranges correspond to the one or more frequency ranges with which the second signal is transmitted. Alternatively and/or additionally, the first device determines to transmit the second signal via the one or more first frequency ranges on the activated BWP based upon a determination that the identity of the second information is associated with the index in the frequency list and/or a determination that the index is associated with the one or more first frequency ranges.

In one embodiment, the first device determines to transmit the second signal via one or more second frequency ranges, associated with the index in the frequency list, on a BWP pre-configured and/or hard-coded in the first device. For example, the one or more second frequency ranges correspond to the one or more frequency ranges with which the second signal is transmitted. Alternatively and/or additionally, the first device determines to transmit the second signal via the one or more second frequency ranges on the BWP based upon a determination that the identity of the second information is associated with the index in the frequency list and/or a determination that the index is associated with the one or more second frequency ranges.

In one embodiment, the second information comprises a BWP identity associated with an uplink BWP. In one embodiment, the second signal is transmitted via the uplink BWP based upon a determination that the uplink BWP is associated with the BWP identity.

In one embodiment, the BWP identity is associated with an activated BWP.

In one embodiment, the BWP identity is associated with a deactivated BWP.

In one embodiment, the first device performs BWP switching to transmit the second signal if one or more BWPs associated with the BWP identity in the second information is not activated (e.g., the one or more BWPs are not currently activated). For example, the second signal may be transmitted via the one or more BWPs associated with the BWP identity after performing the BWP switching.

In one embodiment, the second information comprises one or more identities associated with one or more carrier frequencies.

In one embodiment, the first device transmits the second signal via the one or more carrier frequencies indicated in the second information.

In one embodiment, each index in the frequency list is associated with a frequency range in one BWP.

In one embodiment, each index in the frequency list is associated with a frequency range in multiple BWPs.

Referring back to FIGS. 3 and 4, in one exemplary embodiment of a first device requesting one or more sidelink retransmission resources from a base station, the device 300 includes a program code 312 stored in the memory 310. The CPU 308 could execute program code 312 to enable the first device (i) to receive a first information from the base station, wherein the base station configures the first device with a configured grant for sidelink via the first information, (ii) to receive a second information from the base station, wherein the second information is indicative of one or more available frequency ranges for transmitting a sidelink retransmission resource request, (iii) to transmit sidelink data to a second device based on the configured grant for sidelink associated with the first information, (iv) to receive and/or detect a first signal from the second device, wherein the first signal indicates a reception result associated with the sidelink data, and (v) to transmit a second signal, to request one or more sidelink retransmission resources, to the base station via one or more frequency ranges determined based on the second information. Furthermore, the CPU 308 can execute the program code 312 to perform one, some and/or all of the above-described actions and steps and/or others described herein.

Figure 14:
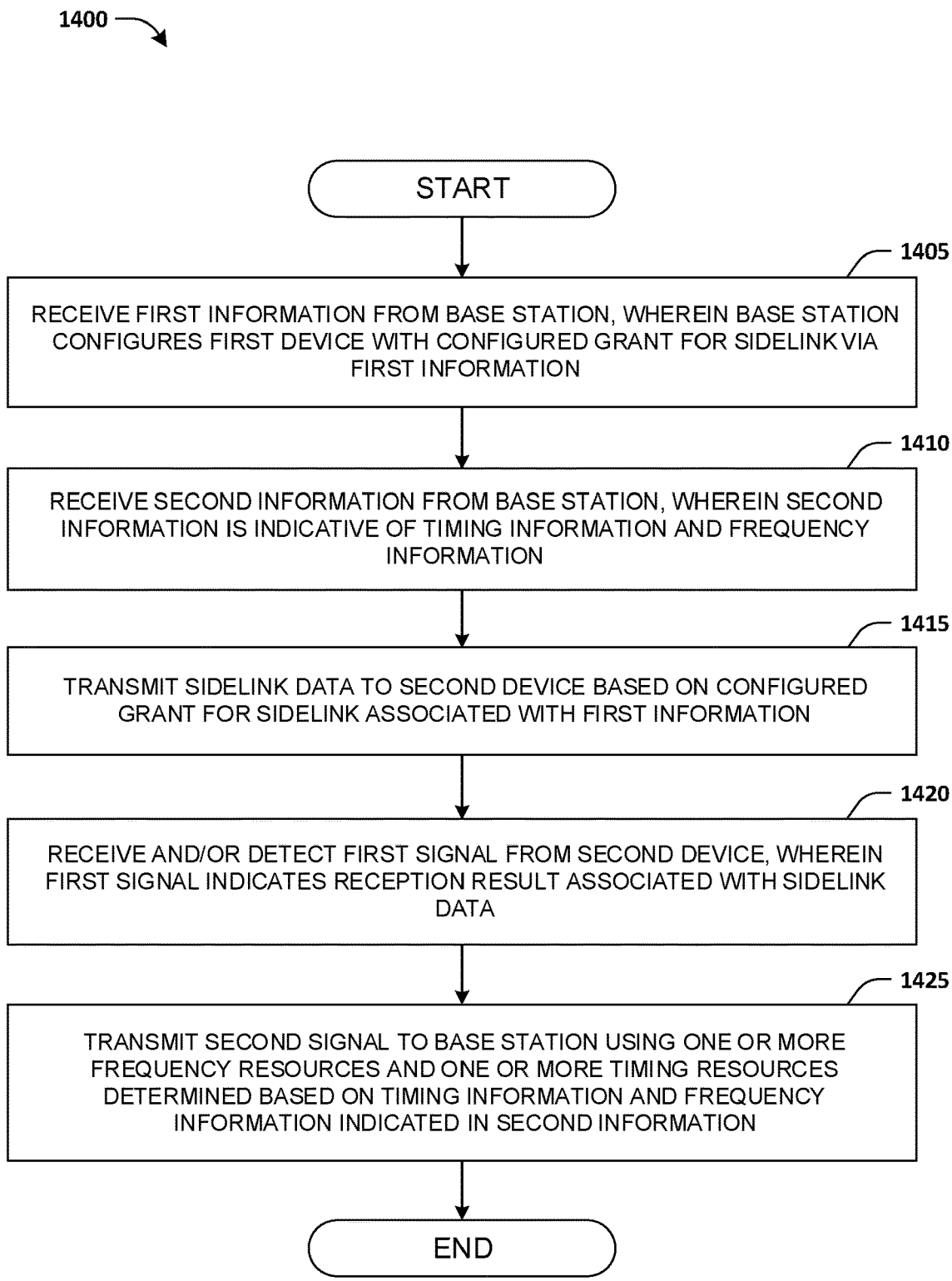
FIG. 14 is a flow chart according to one exemplary embodiment.

FIG. 14 is a flow chart 1400 according to one exemplary embodiment from the perspective of a first device requesting one or more sidelink retransmission resources from a base station. In step 1405, the first device receives a first information from the base station, wherein the base station configures the first device with a configured grant for sidelink via the first information. In step 1410, the first device receives a second information from the base station, wherein the second information is indicative of timing information and frequency information. In step 1415, the first device transmits sidelink data to a second device based on the configured grant for sidelink associated with the first information. In step 1420, the first device receives and/or detects a first signal from the second device, wherein the first signal indicates a reception result associated with the sidelink data. In step 1425, the first device transmits a second signal to the base station using one or more frequency resources and one or more timing resources determined based on the timing information and the frequency information indicated in the second information.

In one embodiment, the timing information comprises one or more timing offsets. For example, the first device may determine the one or more timing resources based on a timing offset of the one or more timing offsets and/or a time of an event (e.g., the event may correspond to at least one of reception of the first information, reception of the second information, transmission of the sidelink data, reception of the first signal, etc.)

In one embodiment, the timing information comprises a periodicity, wherein the first device determines the one or more timing resources based on the periodicity, wherein each pair of consecutive timing resources available for transmitting the second signal is spaced by the periodicity.

In one embodiment, the timing information comprises a bitmap, wherein each entry of the bitmap is associated with a time period and indicates whether the time period or the times is available for transmitting the second signal.

In one embodiment, the one or more timing resources are determined based on the bitmap. For example, the one or more timing resources may correspond to one or more time periods or the times indicated by the bitmap as available for transmitting the second signal.

In one embodiment, the frequency information indicates at least one frequency range for one or more BWPs for the first device. For example, the second signal may be transmitted via a frequency range indicated by the frequency information.

In one embodiment, the frequency information indicates one or more BWP identities, wherein the first device can transmit the second signal on one or more BWPs associated with the one or more BWP identities.

Referring back to FIGS. 3 and 4, in one exemplary embodiment of a first device requesting one or more sidelink retransmission resources from a base station, the device 300 includes a program code 312 stored in the memory 310. The CPU 308 could execute program code 312 to enable the first device (i) to receive a first information from the base station, wherein the base station configures the first device with a configured grant for sidelink via the first information, (ii) to receive a second information from the base station, wherein the second information is indicative of timing information and frequency information, (iii) to transmit sidelink data to a second device based on the configured grant for sidelink associated with the first information, (iv) to receive and/or detect a first signal from the second device, wherein the first signal indicates a reception result associated with the sidelink data, and (v) to transmit a second signal to the base station using one or more frequency resources and one or more timing resources determined based on the timing information and the frequency information indicated in the second information. Furthermore, the CPU 308 can execute the program code 312 to perform one, some and/or all of the above-described actions and steps and/or others described herein.

With respect to FIGS. 11-14, in one embodiment, the first information and the second information are received via a single message (e.g., a RRC message). For example, the first information and the second information may be included in the single message received from the base station.

In one embodiment, the first information and the second information are received via different messages (e.g., RRC messages). For example, the first information may be included in a first message received from the base station and the second information may be included in a second message received from the base station.

In one embodiment, the one or more first available resources (and/or one or more resources used for transmitting the second signal) may be one or more PUCCH resources.

In one embodiment, the one or more first available resources (and/or one or more resources used for transmitting the second signal) may be one or more PUSCH resources.

In one embodiment, the one or more first available resources (and/or one or more resources used for transmitting the second signal) may be one or more SR resources.

In one embodiment, the first signal is a SL HARQ NACK or a SL HARQ ACK.

In one embodiment, the first signal indicates the second device fails to decode the sidelink data.

In one embodiment, the first signal indicates a reception failure associated with the sidelink data.

In one embodiment, the first device does not receive and/or detect the first signal from the second device. In one embodiment, the first device transmits the second signal if the first device does not detect the first signal from the second device.

In one embodiment, the first device transmits the second signal based on a determination that the first signal is a NACK associated with the sidelink data (and/or the first device transmits the second signal if the first device considers the first signal as a NACK associated with the sidelink data).

In one embodiment, the first device transmits the second signal based on a determination that the second device fails to decode the sidelink data.

In one embodiment, the second signal is a SR.

In one embodiment, the second signal is a BSR.

In one embodiment, the second signal is a HARQ feedback.

In one embodiment, the second signal corresponds to a PUCCH transmission (e.g., transmission of the second signal is a PUCCH transmission).

In one embodiment, the second signal is associated with one or more sidelink HARQ processes.

In one embodiment, the first device transmits the second signal to request one or more resources for sidelink retransmission from the base station.

In one embodiment, the sidelink retransmission resource request is transmitted via the second signal.

In one embodiment, the sidelink retransmission resource request is the second signal.

In one embodiment, the sidelink retransmission resource request is a message for the first device to indicate a need for one or more sidelink retransmission resources to the base station.

In one embodiment, the time period or the times is one or more subframes.

In one embodiment, the time period or the times is one or more slots.

In one embodiment, the time period or the times is one or more OFDM symbols.

In one embodiment, the configured grant for sidelink is configured grant Type 1.

In one embodiment, the configured grant for sidelink is configured grant Type 2.

In one embodiment, the first information is received in a RRC message.

In one embodiment, the first information is received in a DCI.

In one embodiment, the second information is received in a RRC message.

In one embodiment, the second information is received in a DCI.

In one embodiment, the second information is received in a DCI for activating the configured grant for sidelink.

In one embodiment, the first device transmits the second signal to request one or more sidelink retransmission resources from the base station.

Figure 15:
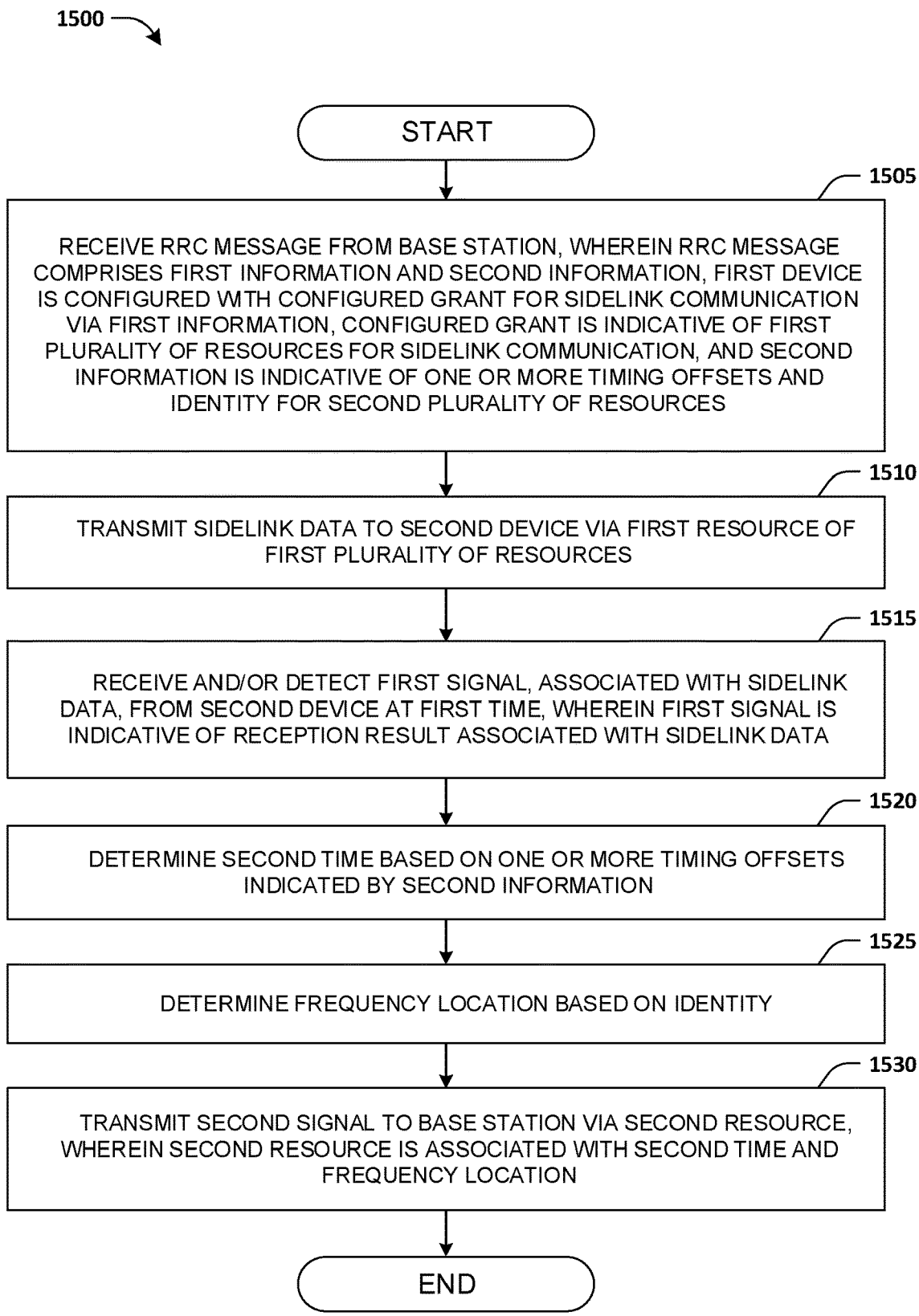
FIG. 15 is a flow chart according to one exemplary embodiment.

FIG. 15 is a flow chart 1500 according to one exemplary embodiment from the perspective of a first device requesting one or more sidelink retransmission resources from a base station. In step 1505, the first device receives a RRC message from the base station. The RRC message comprises first information and second information. The first device is configured with a configured grant for sidelink communication via the first information. The configured grant is indicative of a first plurality of resources for sidelink communication. The second information is indicative of one or more timing offsets and an identity for a second plurality of resources. In step 1510, the first device transmits sidelink data to a second device via a first resource of the first plurality of resources. In step 1515, the first device receives and/or detects a first signal, associated with the sidelink data, from the second device at a first time, wherein the first signal is indicative of a reception result associated with the sidelink data. In step 1520, the first device determines (and/or derives) a second time based on the one or more timing offsets indicated by the second information. In step 1525, the first device determines (and/or derives) a frequency location based on the identity. In step 1530, the first device transmits a second signal to the base station via a second resource, wherein the second resource is associated with the second time and the frequency location.

In one embodiment, the first device transmits the second signal at the second time.

In one embodiment, the first device transmits the second signal via the frequency location.

In one embodiment, the second time is determined (and/or derived) based on the first time when the first signal from the second device is received and/or detected.

In one embodiment, the first device is configured with a frequency resource list comprising resources. The first device requests one or more sidelink retransmission resources via one or more resources of the frequency resource list. For example, the first device may request the one or more sidelink retransmission resource by transmitting one or more retransmission indications to the base station via the one or more resources. Alternatively and/or additionally, resources of frequency resource list are used for requesting one or more sidelink retransmission resources.

In one embodiment, the identity is associated with an index in the frequency list. The frequency location may be determined based on a determination that the frequency location is associated with the index. The frequency resource list is associated with one or more BWPs for the first device. The second resource may be associated with at least one BWP of the one or more BWPs.

In one embodiment, the frequency resource list comprises the second resource and/or the identity is indicative of the second resource in the frequency resource list.

In one embodiment, the frequency resource list comprises the frequency location and the identity is indicative of the frequency location in the frequency resource list.

In one embodiment, the second plurality of resources comprises the second resource.

In one embodiment, the second plurality of resources are each associated with a same frequency location, the second plurality of resources each have a same format, and/or the second plurality of resources each have a same number of OFDM symbols.

In one embodiment, a timing offset of the one or more timing offsets is indicative of a fixed time period and/or a fixed value between a resource of the second plurality of resources and a resource of the first plurality of resources associated with the resource of the second plurality of resources. For example, a timing offset of the one or more timing offsets may be indicative of a time period between a third resource of the second plurality of resources and a fourth resource of the first plurality of resources, wherein the fourth resource is associated with the third resource. Alternatively and/or additionally, a timing offset of the one or more timing offsets may be indicative of a time period between each resource of the second plurality of resources and a resource of the first plurality of resources associated with the resource of the second plurality of resources.

In one embodiment, the first signal is a SL HARQ feedback.

In one embodiment, the second signal is a HARQ feedback.

In one embodiment, the configured grant for sidelink communication does not comprise an activation command. Alternatively and/or additionally, the configured grant for sidelink communication may comprise an activation command. Alternatively and/or additionally, the configured grant for sidelink communication is active when the RRC message is received and the configured grant for sidelink communication is without an activation command.

In one embodiment, the frequency location of the second resource is associated with a starting PRB of the second resource and/or a number of PRBs of the second resource. For example, the frequency location may be indicative of the starting PRB and/or the number of PRBs of the second resource. Alternatively and/or additionally, the frequency location may comprise PRBs corresponding to the starting PRB and/or the number of PRBs of the second resource.

In one embodiment, each resource of the first plurality of resources is associated with a resource of the second plurality of resources. For example, each resource of the first plurality of resources is associated with a single resource of the second plurality of resources, respectively.

In one embodiment, each resource of the second plurality of resources is associated with one or more resources of the first plurality of resources.

In one embodiment, each resource of the second plurality of resources is associated with one or more resources of the first plurality of resources, where the one or more resources of the first plurality of resources are within a periodicity associated with the first plurality of resources. The periodicity is configured for spacing (e.g., separating in time domain) resources of the first plurality of resources. For example, one or more resources of the first plurality of resources may be spaced from one or more different resources of the first plurality of resources based upon the periodicity (e.g., a time-length corresponding to the periodicity may be between the one or more resources and the one or more different resources). In one embodiment, each resource of the first plurality of resources is configured in a periodic manner with a periodicity (e.g., a resource of the first plurality of resources may be spaced (and/or separated in time domain) from a different resource of the first plurality of resources based upon the periodicity). In one embodiment, each set of one or more resources of the first plurality of resources is configured in a periodic manner with a periodicity (e.g., a set of one or more resources of the first plurality of resources may be spaced (and/or separated in time domain) from a different set of one or more resources of the first plurality of resources based upon the periodicity).

In one embodiment, the first device updates the fixed time period and/or the fixed value responsive to receiving, from the base station, a second RRC message for updating the first information and/or the second information. For example, the first device may update the fixed time period by changing the fixed time period and/or the fixed value to a different fixed time period and/or a different fixed value indicated by the second RRC message. In one embodiment, the first device updates the one or more timing offsets and/or the identity responsive to receiving, from the base station, a second RRC message for updating the first information and/or the second information. For example, the first device may update the one or more timing offsets and/or the identity by changing the one or more timing offsets and the identity to the one or more timing offsets and/or the identity indicated by the second RRC message.

In one embodiment, the second signal comprises a request for one or more sidelink retransmission resources for retransmitting the sidelink data to the second device. In one embodiment, the first device derives content of the second signal based on the first signal.

Referring back to FIGS. 3 and 4, in one exemplary embodiment of a first device requesting one or more sidelink retransmission resources from a base station, the device 300 includes a program code 312 stored in the memory 310. The CPU 308 could execute program code 312 to enable the first device (i) to receive a RRC message from the base station, wherein the RRC message comprises first information and second information, the first device is configured with a configured grant for sidelink communication via the first information, the configured grant is indicative of a first plurality of resources for sidelink communication, and the second information is indicative of one or more timing offsets and an identity for a second plurality of resources, (ii) to transmit sidelink data to a second device via a first resource of the first plurality of resources, (iii) to receive and/or detect a first signal, associated with the sidelink data, from the second device at a first time, wherein the first signal is indicative of a reception result associated with the sidelink data, (iv) to determine a second time based on the one or more timing offsets indicated by the second information, (v) to determine a frequency location based on the identity, and (vi) to transmit a second signal to the base station via a second resource, wherein the second resource is associated with the second time and the frequency location. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 11-15. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of method steps illustrated in one or more of FIGS. 11-15, and/or one, some and/or all of the above-described actions and steps and/or others described herein.

It may be appreciated that applying one or more of the techniques presented herein may result in one or more benefits including, but not limited to, enabling a device, such as a Tx UE, to determine one or more resources for transmission of a retransmission indication associated with a configured grant for sidelink.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device for requesting one or more sidelink retransmission resources from a base station, the method comprising:
   receiving a message, comprising information, from the base station, wherein:
      the information is indicative of one or more timing offsets and an identity for a second plurality of resources;
   transmitting sidelink data to a second device via a first resource of a first plurality of resources associated with the first device;
   at least one of receiving or detecting a first signal, associated with the sidelink data, from the second device at a first time, wherein the first signal is indicative of a reception result associated with the sidelink data;
   determining a second time based on the one or more timing offsets indicated by the information;
   determining a frequency location based on the identity; and
   transmitting a second signal to the base station via a second resource, wherein the second resource is associated with the second time and the frequency location.

2. The method of claim 1, wherein:
   the determining the second time is performed based on the first time when the first signal from the second device is at least one of received or detected.

3. The method of claim 1, wherein the first device is configured with a frequency resource list comprising resources, the method comprising:
   requesting one or more sidelink retransmission resources via one or more resources of the frequency resource list.

4. The method of claim 3, wherein:
   the identity is associated with an index in the frequency resource list;
   the determining the frequency location is performed based on a determination that the frequency location is associated with the index;
   the frequency resource list is associated with one or more Bandwidth Parts (BWP) for the first device; and
   the second resource is associated with at least one BWP of the one or more BWPs.

5. The method of claim 3, wherein:
   the frequency resource list comprises the second resource; and
   the identity is indicative of the second resource in the frequency resource list.

6. The method of claim 1, wherein the second plurality of resources comprises the second resource, wherein at least one of:
   the second plurality of resources are each associated with a same frequency location;
   the second plurality of resources each have a same format; or
   the second plurality of resources each have a same number of Orthogonal Frequency Division Multiplexing (OFDM) symbols.

7. The method of claim 1, wherein:
   the second plurality of resources comprises the second resource; and
   a timing offset of the one or more timing offsets is indicative of at least one of a fixed time period or a fixed value between a resource of the second plurality of resources and a resource of the first plurality of resources associated with the resource of the second plurality of resources.

8. The method of claim 1, wherein:
   the first signal is a sidelink Hybrid Automatic Repeat Request (SL HARQ) feedback.

9. The method of claim 1, wherein:
   the second signal is a Hybrid Automatic Repeat Request (HARQ) feedback.

10. The method of claim 1, wherein:
    a configured grant for sidelink communication is active when the receiving the message is performed and the configured grant for sidelink communication is without an activation command.

11. The method of claim 1, wherein:
    the frequency location of the second resource is associated with at least one of a starting Physical Resource Block (PRB) of the second resource or a number of PRBs of the second resource.

12. The method of claim 1, wherein:
    each resource of the first plurality of resources is associated with a resource of the second plurality of resources.

13. The method of claim 1, wherein:
each resource of the second plurality of resources is associated with one or more resources of the first plurality of resources.

14. The method of claim 1, wherein:
each resource of the second plurality of resources is associated with one or more resources of the first plurality of resources, where the one or more resources of the first plurality of resources are within a periodicity associated with the first plurality of resources.

15. The method of claim 7, comprising:
updating at least one of the fixed time period or the fixed value responsive to receiving, from the base station, a second message for updating the information.

16. The method of claim 1, wherein:
the second signal comprises a request for one or more sidelink retransmission resources for retransmitting the sidelink data to the second device.

17. A communication device, comprising:
a processor; and
memory comprising processor-executable instructions that when executed by the processor cause performance of operations for requesting one or more sidelink retransmission resources from a base station, the operations comprising:
receiving a message, comprising information, from the base station, wherein:
the information is indicative of one or more timing offsets and an identity for a second plurality of resources;
transmitting sidelink data to a second device via a first resource of a first plurality of resources associated with the communication device;
at least one of receiving or detecting a first signal, associated with the sidelink data, from the second device at a first time, wherein the first signal is indicative of a reception result associated with the sidelink data;
determining a second time based on the one or more timing offsets indicated by the information;
determining a frequency location based on the identity; and
transmitting a second signal to the base station via a second resource, wherein the second resource is associated with the second time and the frequency location.

18. The communication device of claim 17, wherein:
the determining the second time is performed based on the first time when the first signal from the second device is at least one of received or detected.

19. The communication device of claim 17, wherein the communication device is configured with a frequency resource list comprising resources, the operations comprising:
requesting one or more sidelink retransmission resources via one or more resources of the frequency resource list.

20. A non-transitory computer-readable medium comprising processor-executable instructions that when executed by a first device cause performance of operations, comprising:
receiving a message, comprising information, from a base station, wherein:
the information is indicative of one or more timing offsets and an identity for a second plurality of resources;
transmitting sidelink data to a second device via a first resource of a first plurality of resources associated with the first device;
at least one of receiving or detecting a first signal, associated with the sidelink data, from the second device at a first time, wherein the first signal is indicative of a reception result associated with the sidelink data;
determining a second time based on the one or more timing offsets indicated by the information;
determining a frequency location based on the identity; and
transmitting a second signal to the base station via a second resource, wherein the second resource is associated with the second time and the frequency location.

* * * * *